United States Patent
Bao et al.

(10) Patent No.: US 12,182,057 B2
(45) Date of Patent: Dec. 31, 2024

(54) INTER INTEGRATED CIRCUIT-BASED COMMUNICATION METHOD AND APPARATUS

(71) Applicant: Huawei Technologies Co., Ltd., Shenzhen (CN)

(72) Inventors: Pengxin Bao, Chengdu (CN); Haibo Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/184,892

(22) Filed: Mar. 16, 2023

(65) Prior Publication Data

US 2023/0222085 A1 Jul. 13, 2023

Related U.S. Application Data

(63) Continuation of application No. PCT/CN2020/115996, filed on Sep. 17, 2020.

(51) Int. Cl.
*G06F 13/42* (2006.01)
*H04L 1/1607* (2023.01)
*H04L 45/74* (2022.01)
*H04L 69/22* (2022.01)

(52) U.S. Cl.
CPC ........ *G06F 13/4282* (2013.01); *H04L 1/1607* (2013.01); *H04L 45/74* (2013.01); *H04L 69/22* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 2009/0185549 A1* | 7/2009 | Shon | H04L 69/04 370/349 |
| 2013/0174208 A1 | 7/2013 | Lee et al. | |
| 2015/0046627 A1* | 2/2015 | Tailliet | G06F 13/4291 710/314 |
| 2015/0286606 A1 | 10/2015 | Sengoku | |

(Continued)

FOREIGN PATENT DOCUMENTS

| | | |
|---|---|---|
| CN | 102025565 A | 4/2011 |
| CN | 103914427 A | 7/2014 |

(Continued)

*Primary Examiner* — Henry Tsai
*Assistant Examiner* — Dean Phan
(74) *Attorney, Agent, or Firm* — Conley Rose, P.C.

(57) ABSTRACT

An inter integrated circuit ($I^2C$)-based communication method incudes when an $I^2C$ signal is encapsulated into a data packet for transparent transmission, an $I^2C$ status is indicated by a first field in a packet header of the data packet. The data packet may have no load part, or the data packet has a load part but the load part is used to carry a slave address, a read/write flag, or $I^2C$ data. Because the $I^2C$ status is indicated in the packet header of the data packet, the $I^2C$ status may be encapsulated in a same data packet together with the slave address, the read/write flag, or the $I^2C$ data. In other words, the $I^2C$ status may not need to occupy one data packet separately.

30 Claims, 15 Drawing Sheets

(56) References Cited

U.S. PATENT DOCUMENTS

| | | |
|---|---|---|
| 2016/0357701 A1 | 12/2016 | Lee et al. |
| 2017/0222829 A1 | 8/2017 | Kessler et al. |
| 2018/0173671 A1 | 6/2018 | Fujiki et al. |
| 2019/0238362 A1* | 8/2019 | Mishra .............. H04L 12/40032 |
| 2019/0394675 A1* | 12/2019 | Baek .................... H04W 28/06 |
| 2020/0250128 A1 | 8/2020 | Takahashi et al. |

FOREIGN PATENT DOCUMENTS

| | | | |
|---|---|---|---|
| CN | 106170781 A | 11/2016 |
| CN | 110945490 A | 3/2020 |
| CN | 111124979 A | 5/2020 |
| JP | 2020010395 A | 1/2020 |
| WO | 2015155242 A1 | 10/2015 |
| WO | 2016208038 A1 | 12/2016 |

* cited by examiner

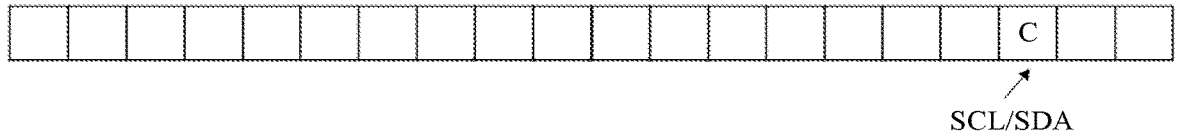

FIG. 5

| Region | Field type | Description |
|---|---|---|
| Packet header | 2 bits indicating a load data type | Indicate whether a load is I²C data or a special code pattern |
| | 62 bits of other fields | Indicate other information, which is not directly related to an I²C |
| Load | Load | 8-bit I²C data/special code pattern |
| Packet tail | CRC32 | 32-bit CRC |

FIG. 6A

| Special pattern | Descriptions |
|---|---|
| 0x00 | Start |
| 0x01 | Stop |
| 0x02 | ACK |
| 0x03 | NACK |
| Other | Reserved |

FIG. 6B

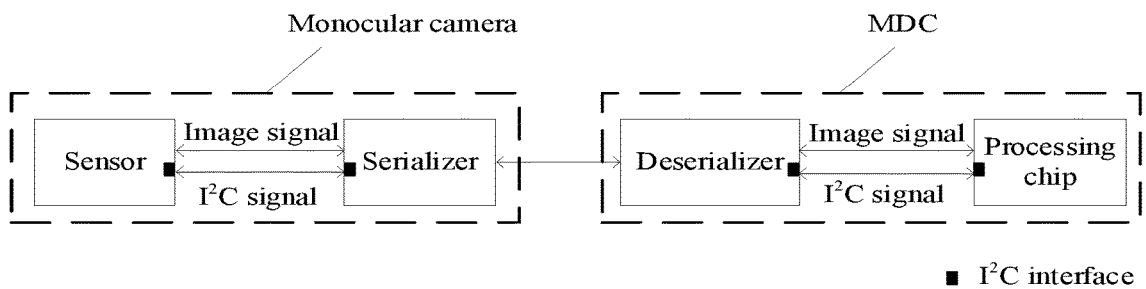

■ I²C interface

FIG. 7

| Region | Field type | Field length (bit) |
|---|---|---|
| Packet header | First field ($I^2C$ status) | 3 |
| Load | Load | 8 |
| Packet tail | CRC | 8 |

FIG. 11

| Value of a first field | Descriptions |
|---|---|
| 0X0 | S (Start of data transmission) |
| 0X1 | Continuation of data transmission |
| 0X2 | P (Stop of data transmission) |
| 0X3 | Acknowledgment (NACK) |
| 0X4 | Negative acknowledgment (NACK) |
| 0X5 to 0x7 | Reserved |

FIG. 12

| Region | Field type | Field length (bit) |
|---|---|---|
| Packet header | Second field (flow ID) | 2 |
| | First field ($I^2C$ status) | 3 |
| | Reserved | 3 |
| Load | Load | 8 |
| Packet tail | CRC | 8 |

FIG. 14

| Region | Field type | Field length (bit) |
|---|---|---|
| Packet header | Third field ($I^2C$) | 4 |
| | Second field (flow ID) | 2 |
| | First field ($I^2C$ status) | 3 |
| | Reserved | 7 |
| Load | Load | 8 |
| Packet tail | CRC | 8 |

FIG. 15

| Region | Field type | |
|---|---|---|
| Packet header | Fourth field (encapsulation service type) | 4 |
| | Fifth field (data format) | 6 |
| | Second field (flow ID) | 2 |
| | First field ($I^2C$ status) | 3 |
| | Reserved | 1 |
| Load | Load | 8 |
| Packet tail | CRC | 8 |

FIG. 16

| Region | Field type | Field length (bit) |
|---|---|---|
| Packet header | Third field ($I^2C$-based) | 4 |
| | Second field (flow ID) | 2 |
| | Cyclic sequence number | 2 |
| | First field ($I^2C$ status) | 3 |
| | Load length indicator | 5 |
| Load | Load | 8 |
| Packet tail | CRC | 8 |

FIG. 17

| Region | Field type | Field length (bit) |
|---|---|---|
| Packet header | Fourth field (encapsulation service type) | 4 |
| | Fifth field (data format) | 6 |
| | First field ($I^2C$ status) | 3 |
| | Reserved | 5 |
| | Second field (flow ID) | 2 |
| | Cyclic sequence number | 6 |
| | Reserved | 6 |
| | Load length indicator | 16 |
| Load | Load | ≤65535×8 |
| Packet tail | CRC | 16 |

INTER INTEGRATED CIRCUIT-BASED COMMUNICATION METHOD AND APPARATUS

CROSS-REFERENCE TO RELATED APPLICATIONS

This is a continuation of International Patent Application No. PCT/CN2020/115996 filed on Sep. 17, 2020, the disclosure of which is hereby incorporated by reference in its entirety.

TECHNICAL FIELD

This application relates to the field of communication technologies, and in particular, to an inter integrated circuit ($I^2C$) based communication method and apparatus.

BACKGROUND

An $I^2C$ bus is a low-speed serial bus for short-distance transmission that is routed on a printed circuit board (PCB), and is configured to connect a microcontroller and a peripheral device of the microcontroller to transmit an $I^2C$ signal.

The $I^2C$ bus may be used in a plurality of possible scenarios, for example, may be used in a transmission scenario in an intra-vehicle network. However, in some intra-vehicle network scenarios, a transmission distance between a peripheral device and a microcontroller is long. For example, a camera (that is, the peripheral device) is mounted on a windshield, a rear bumper, or a door post, and the microcontroller is mounted inside a vehicle. Therefore, an $I^2C$ signal needs to be encapsulated in a data packet that supports long-distance transmission for transparent transmission. How to reduce bandwidth required during transparent transmission of the $I^2C$ signal and improve transmission efficiency is a problem to be resolved in this application.

SUMMARY

This application provides an $I^2C$-based communication method and apparatus, to reduce bandwidth required for transmitting an $I^2C$ signal and improve transmission efficiency.

According to a first aspect, an $I^2C$-based communication method is provided. The method may be applied to a device that supports $I^2C$ communication. For example, the method is applied to a first device. The method includes that the first device generates a data packet, where the data packet includes a packet header part and a load part, the packet header part includes a first field, the first field is used to indicate an $I^2C$ status, and the $I^2C$ status includes any one of start of data transmission, continuation of data transmission, stop of data transmission, an acknowledgment (ACK), or a negative acknowledgment (NACK), a length of the load is greater than or equal to 0 bits, and when the length of the load is 0, it indicates that the data packet has no load; and the first device sends the data packet to a second device.

In this embodiment of this application, because the $I^2C$ status is indicated by using the first field in a packet header of the data packet, the load part does not need to be occupied to carry the $I^2C$ status such that a status such as the start of data transmission, the continuation of data transmission, the ACK, or the NACK does not need to be separately encapsulated into a data packet, but is encapsulated into a same data packet together with a slave address, a read/write flag, $I^2C$ data, or the like. Therefore, transmission bandwidth can be reduced, and transmission efficiency can be improved.

In a possible implementation, a value of the first field includes one or more of a first value used to indicate that the $I^2C$ status is the start of data transmission; a second value used to indicate that the $I^2C$ status is the continuation of data transmission; a third value used to indicate that the $I^2C$ status is the stop of data transmission; a fourth value used to indicate that the $I^2C$ status is the ACK; and a fifth value used to indicate that the $I^2C$ status is the NACK.

Certainly, the foregoing is merely an example rather than a limitation. During specific implementation, the first field may have more or fewer values.

In a possible implementation, when the first field indicates that the $I^2C$ status is the start of data transmission, the load part carries a slave address and a read/write flag.

In other words, an indication indicating the start of data transmission may be encapsulated into a same data packet together with the slave address and the read/write flag such that transmission bandwidth can be reduced, and transmission efficiency can be improved.

In a possible implementation, when the first field indicates that the $I^2C$ status is the continuation of data transmission, the load part carries $I^2C$ data.

In this way, the second device may determine, based on the first field, that the $I^2C$ status is the continuation of data transmission, and further parse out the $I^2C$ data from the load of the data packet, so that reliability of this solution can be improved.

In a possible implementation, the packet header part of the data packet may further include a second field, the second field is used to indicate a flow ID of a flow to which the data packet belongs, and the flow ID corresponds to at least one $I^2C$ interface.

A correspondence between the flow ID and the $I^2C$ interface may be a one-to-one, one-to-many, many-to-one, or many-to-many relationship. This is not limited in this application.

In this way, during transmission of the data packet, a serializer or a deserializer (in the first device or the second device) may distinguish between $I^2C$ interfaces by identifying flow IDs, and allocate the data packet to an $I^2C$ interface corresponding to the flow ID of the data packet for transmission, so that simultaneous transmission of signals on a plurality of $I^2C$ interfaces can be supported between the first device and the second device, and therefore transmission efficiency can be further improved.

In a possible implementation, the packet header part of the data packet may further include a third field, and the third field is used to indicate that the data packet is an $I^2C$-based data packet.

The third field may be further implemented by using one field, or may be implemented by using a plurality of fields. This is not limited herein.

In this way, the second device may determine, based on the third field, that the data packet is an $I^2C$-based data packet, and further receive and process data in the data packet based on an $I^2C$ protocol such that reliability of this solution can be further improved.

According to a second aspect, an $I^2C$-based communication method is provided. The method may be applied to a device that supports $I^2C$ communication. For example, the method is applied to a second device. The method includes that the second device receives a data packet from a first device, where the data packet includes a packet header part and a load part, the packet header part includes a first field, the first field is used to indicate an $I^2C$ status, and the $I^2C$ status includes any one of the following: start of data transmission, continuation of data transmission, stop of data transmission, an ACK, or a NACK, and a length of the load is greater than or equal to 0 bits; and the second device determines the I²C status based on the first field.

In a possible implementation, a value of the first field includes one or more of a first value used to indicate that the I²C status is the start of data transmission; a second value used to indicate that the I²C status is the continuation of data transmission; a third value used to indicate that the I²C status is the stop of data transmission; a fourth value used to indicate that the I²C status is the ACK; and a fifth value used to indicate that the I²C status is the NACK.

Certainly, the foregoing is merely an example rather than a limitation. During specific implementation, the first field may have more or fewer values.

In a possible implementation, the first field indicates that the I²C status is the start of data transmission, and the load part carries a slave address of a slave device and a read/write flag. Correspondingly, after determining that the I²C status is the start of data transmission, the second device may further generate a start state on at least one I²C interface, and send, through the at least one I²C interface, the slave address and the read/write flag to the slave device to which the slave address points.

In a possible implementation, the first field indicates that the I²C status is the continuation of data transmission, and the load part carries I²C data. Correspondingly, after determining that the I²C status is the continuation of data transmission, the second device may further send, through at least one I²C interface, the I²C data to a slave device to which a slave address points.

In a possible implementation, the packet header part further includes a second field, the second field is used to indicate a flow identifier (ID) of a flow to which the data packet belongs, and the flow ID corresponds to at least one I²C interface.

A correspondence between the flow ID and the I²C interface may be a one-to-one, one-to-many, many-to-one, or many-to-many relationship. This is not limited in this application.

In a possible implementation, the packet header part further includes a third field, and the third field is used to indicate that the data packet is an I²C-based data packet.

The third field may be specifically implemented by using one field, or may be implemented by using a plurality of fields. This is not limited herein.

According to a third aspect, an I²C-based communication apparatus is provided. The apparatus includes a module configured to perform the method provided in the first aspect or any possible implementation of the first aspect.

For example, the apparatus may include a processing module configured to generate a data packet, where the data packet includes a packet header part and a load part, the packet header part includes a first field, the first field is used to indicate an I²C status, and the I²C status includes any one of start of data transmission, continuation of data transmission, stop of data transmission, an ACK, or a NACK, and a length of the load is greater than or equal to 0 bits; and a sending module, configured to send the data packet to a second device.

In a possible implementation, a value of the first field includes one or more of a first value used to indicate that the I²C status is the start of data transmission; a second value used to indicate that the I²C status is the continuation of data transmission; a third value used to indicate that the I²C status is the stop of data transmission; a fourth value used to indicate that the I²C status is the ACK; and a fifth value used to indicate that the I²C status is the NACK.

In a possible implementation, the first field indicates that the I²C status is the start of data transmission, and the load part carries a slave address of a slave device and a read/write flag.

In a possible implementation, the first field indicates that the I²C status is the continuation of data transmission, and the load part carries I²C data.

In a possible implementation, the packet header part further includes a second field, the second field is used to indicate a flow identifier ID of a flow to which the data packet belongs, and the flow ID corresponds to at least one I²C interface.

In a possible implementation, the packet header part further includes a third field, and the third field is used to indicate that the data packet is an I²C-based data packet.

According to a fourth aspect, an I²C-based communication apparatus is provided. The apparatus includes a module configured to perform the method provided in the second aspect or any possible implementation of the second aspect.

For example, the apparatus may include a receiving module configured to receive a data packet from a first device, where the data packet includes a packet header part and a load part, the packet header part includes a first field, the first field is used to indicate an I²C status, and the I²C status includes any one of start of data transmission, continuation of data transmission, stop of data transmission, an ACK, or a NACK, and a length of the load is greater than or equal to 0 bits; and a processing module configured to determine the I²C status based on the first field.

In a possible implementation, a value of the first field includes one or more of a first value used to indicate that the I²C status is the start of data transmission; a second value used to indicate that the I²C status is the continuation of data transmission; a third value used to indicate that the I²C status is the stop of data transmission; a fourth value used to indicate that the I²C status is the ACK; and a fifth value used to indicate that the I²C status is the NACK.

In a possible implementation, the first field indicates that the I²C status is the start of data transmission, and the load part carries a slave address of a slave device and a read/write flag; and the processing module is further configured to generate a start state on at least one I²C interface, and send, through the at least one I²C interface, the slave address and the read/write flag to the slave device to which the slave address points.

In a possible implementation, the first field indicates that the I²C status is the continuation of data transmission, and the load part carries I²C data; and the processing module is further configured to send, through at least one I²C interface, the I²C data to a slave device to which a slave address points.

In a possible implementation, the packet header part further includes a second field, the second field is used to indicate a flow ID of a flow to which the data packet belongs, and the flow ID corresponds to at least one I²C interface.

In a possible implementation, the packet header part further includes a third field, and the third field is used to indicate that the data packet is an I²C-based data packet.

According to a fifth aspect, an apparatus is provided, and includes at least one processor and a communication interface that is communicatively connected to the at least one processor. The at least one processor executes instructions stored in a memory, so that the apparatus is enabled to perform, by using the communication interface, the method provided in the first aspect or any possible implementation of the first aspect.

Optionally, the memory is located outside the apparatus.

Optionally, the apparatus includes the memory, the memory is connected to the at least one processor, and the memory stores instructions that can be executed by the at least one processor.

According to a sixth aspect, an apparatus is provided, and includes at least one processor and a communication interface that is communicatively connected to the at least one processor. The at least one processor executes instructions stored in a memory, so that the apparatus is enabled to perform, by using the communication interface, the method provided in the second aspect or any possible implementation of the second aspect.

Optionally, the memory is located outside the apparatus.

Optionally, the apparatus includes the memory, the memory is connected to the at least one processor, and the memory stores instructions that can be executed by the at least one processor.

According to a seventh aspect, an apparatus is provided, and includes a processor and an interface circuit. The interface circuit is configured to receive a code instruction and transmit the code instruction to the processor, and the processor runs the code instruction to perform the method provided in the first aspect or any possible implementation of the first aspect.

According to an eighth aspect, an apparatus is provided, and includes a processor and an interface circuit. The interface circuit is configured to receive a code instruction and transmit the code instruction to the processor, and the processor runs the code instruction to perform the method provided in the second aspect or any possible implementation of the second aspect.

According to a ninth aspect, a chip is provided. The chip is coupled to a memory, and is configured to read and execute program instructions stored in the memory, to implement the method provided in the first aspect or any possible implementation of the first aspect.

According to a tenth aspect, a chip is provided. The chip is coupled to a memory, and is configured to read and execute program instructions stored in the memory, to implement the method provided in the second aspect or any possible implementation of the second aspect.

According to an eleventh aspect, a computer readable storage medium is provided. The readable storage medium is configured to store instructions, and when the instructions are executed, the method provided in the first aspect or any possible implementation of the first aspect is implemented.

According to a twelfth aspect, a computer readable storage medium is provided. The readable storage medium is configured to store instructions, and when the instructions are executed, the method provided in the second aspect or any possible implementation of the second aspect is implemented.

According to a thirteenth aspect, a computer program product including instructions is provided. The computer program product stores the instructions, and when the computer program product is run on a computer, the computer is enabled to perform the method provided in the first aspect or any possible implementation of the first aspect.

According to a fourteenth aspect, a computer program product including instructions is provided. The computer program product stores the instructions, and when the computer program product is run on a computer, the computer is enabled to perform the method provided in the second aspect or any possible implementation of the second aspect.

According to a fifteenth aspect, a communication system is provided, and includes a first device and a second device. The first device may perform a corresponding function in the first aspect or any possible implementation of the first aspect, and the second device may perform a corresponding function in the second aspect or any possible implementation of the second aspect.

It should be noted that "coupling" in embodiments of this application indicates a direct combination or an indirect combination of two components.

For beneficial effects of the implementations in the second aspect to the fifteenth aspect, refer to beneficial effects of the corresponding implementations in the first aspect. Details are not described herein again.

BRIEF DESCRIPTION OF DRAWINGS

FIG. 5 is a schematic diagram of a method for encapsulating a transparently transmitted $I^2C$ signal;

FIG. 6A and FIG. 6B each are a schematic diagram of another method for encapsulating a transparently transmitted $I^2C$ signal;

FIG. 7 is a schematic diagram of a possible communication scenario according to an embodiment of this application;

FIG. 11 is a schematic diagram of a possible structure of a data packet according to an embodiment of this application;

FIG. 12 is a schematic diagram of several possible values of a first field;

FIG. 14 is a schematic diagram of another possible structure of a data packet according to an embodiment of this application;

FIG. 15 is a schematic diagram of another possible structure of a data packet according to an embodiment of this application;

FIG. 16 is a schematic diagram of another possible structure of a data packet according to an embodiment of this application;

FIG. 17 is a schematic diagram of another possible structure of a data packet according to an embodiment of this application;

DESCRIPTION OF EMBODIMENTS

Currently, automobiles are developing towards intelligence, and increasingly more driver assistant systems are mounted on the automobiles. Most driver assistant systems rely on cameras to sense an environment around the automobile in real time.

Figure 1:
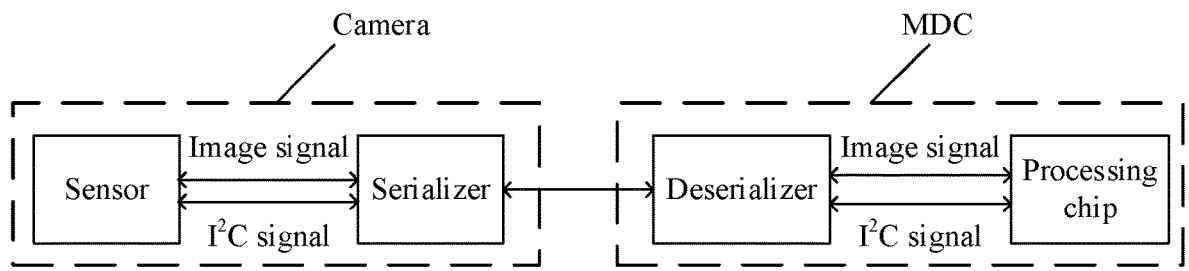
FIG. 1 is a schematic diagram of an image transmission system of a vehicle-mounted camera.

FIG. 1 is a schematic diagram of an image transmission system of a vehicle-mounted camera. The system includes a camera, and further includes a multi-domain controller (MDC) or a mobile data center (MDC). An image signal such as red green blue (RGB) data may be transmitted between the camera and the MDC. The camera and the MDC may further perform I²C communication; in other words, an I²C signal may be further transmitted between the camera and the MDC. The I²C signal is mainly used to control a shooting parameter of the camera, for example, control a pixel quantization depth, a frame rate, sensitivity, white balance, and the like of the camera.

The I²C signal is transmitted based on an I²C bus. The I²C bus is a low-speed serial bus, and is a short-distance transmission bus routed on a PCB and is configured to connect a microcontroller and a peripheral device of the microcontroller.

Figure 2:
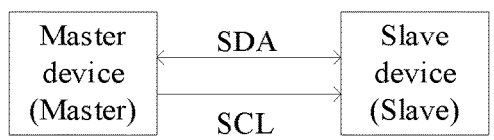
FIG. 2 is a schematic diagram of an $I^2C$ bus.

FIG. 2 is a schematic diagram of the I²C bus. The I²C bus includes two lines. One is a serial data line (SDA) that is used to transmit data. The other is a serial clock line (SCL) that is used to transmit a clock signal. Data lines of all devices connected to the I²C bus are connected to the SDA in the I²C bus, and clock lines of all the devices connected to the I²C bus are connected to the SCL in the I²C bus. Unidirectional transmission from a master device (Master) to a slave device (Slave) is performed on the SCL. Bidirectional transmission from the master device to the slave device or from the slave device to the master device is performed on the SDA. The MDC in FIG. 1 is a master device and is responsible for controlling behavior of an I²C, the camera is a slave device, and the slave device is configured to perform a related operation according to a command of the master device; or a processing chip in the MDC in FIG. 1 is a master device, and a deserializer, a serializer, or a sensor is a slave device.

It should be understood that, in FIG. 2, as an example, one master device is communicatively connected to one slave device. In actual application, one master device may be communicatively connected to a plurality of slave devices; in other words, one master device may control a plurality of slave devices. In addition, in this specification, the master device may also be referred to as a master control device, a master node, or the like, and the slave device may also be referred to as a slave node, a peripheral device, a peripheral component, an external component, a peripheral device, or the like. In this embodiment of this application, unless otherwise specified, meanings of I²C and I²C are the same.

Figure 3:
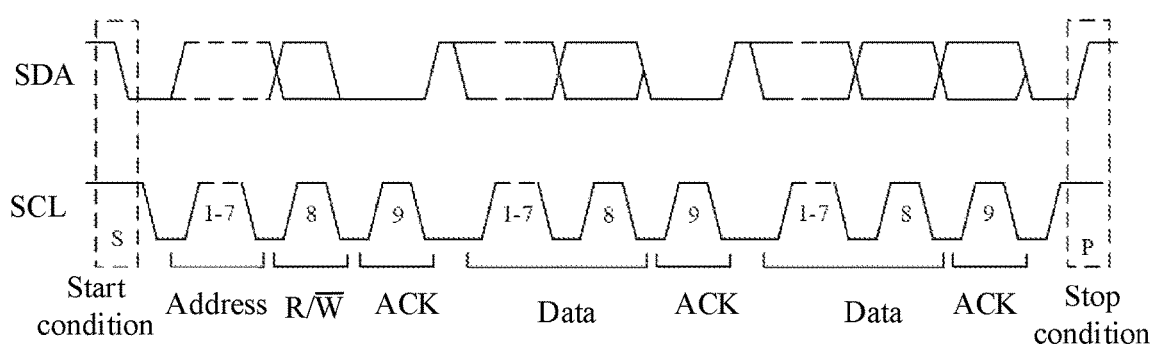
FIG. 3 is a possible diagram of an $I^2C$ time sequence.

The master device controls the slave device by controlling level states (time sequences) of the two lines. FIG. 3 is an example of a diagram of an I²C time sequence.

When the master device starts to communicate with the slave device, a start signal (or a start state) is generated on the I²C bus. To be specific, the SCL is at a high level, and the SDA changes from a high level to a low level. After the start signal appears, the I²C bus is considered as "busy", and subsequent I²C bus addressing, I²C data transmission, or the like may be performed.

After the start state occurs, the master device and the slave device start to exchange data. The master device and the slave device exchange data of fixed 8 bits each time, and after each interaction is completed, a data transmitting end needs to receive, before performing a next operation (for example, sending next 8-bit data), a 1-bit acknowledgment signal fed back by a receiving end. There are two types of acknowledgment signals: an ACK and a NACK, and the acknowledgment signal is sent by a data receiver to a data sender.

In a process of data transmission between the master device and the slave device, the 8-bit data exchanged between the master device and the slave device for the first time is used for bus addressing. 7 most significant bits indicate an address of the slave device that currently communicates with the master device, and 1 least significant bit is a read/write (R/W) flag (or a read/write flag bit) and is used to indicate whether the current communication is data reading or data writing (in other words, whether the data is sent from the master device to the slave device or from the slave device to the master device). Data following a first group of 8-bit data is I²C data that needs to be transmitted in the current communication. The I²C data is a shooting parameter such as pixel quantization depth, a frame rate, sensitivity, or white balance of a camera.

After the data transmission between the master device and the slave device is completed, that is, when the master device stops communicating with the slave device, a stop signal (or stop state) is generated on the I²C bus. The SCL is at a high level, and the SDA changes from a low level to a high level. After the stop signal, the I²C bus is considered as "idle".

As described above, I²C communication between the master device and the slave device includes that the master device controls the slave device to send data to the master device (that is, a data reading procedure), and the master device controls the slave device to receive data sent by the master device (that is, a data writing procedure). The reading procedure and the writing procedure are separately described below by using examples.

Figure 4A:
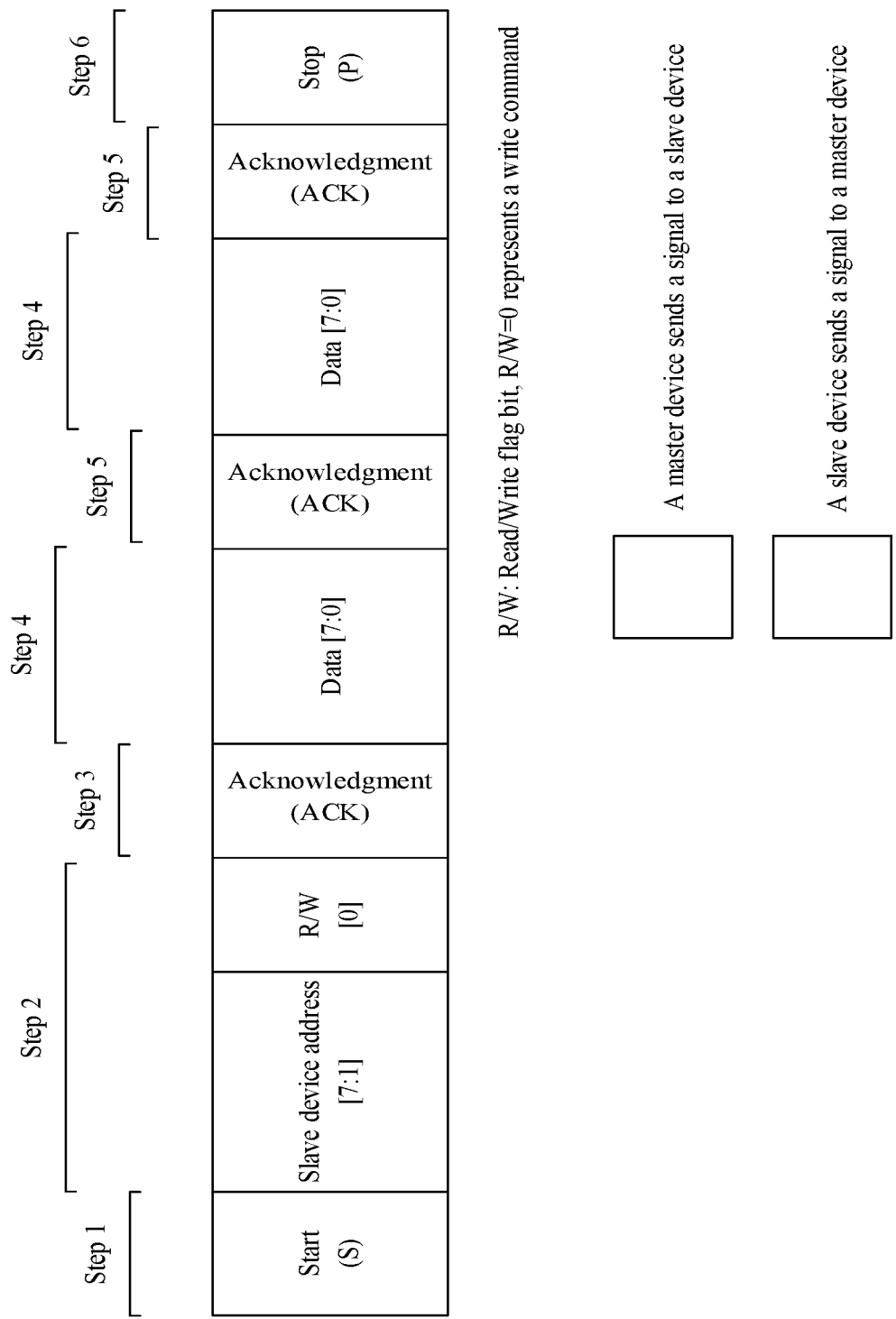
FIG. 4A is a possible flowchart of data writing of an $I^2C$ bus.

As shown in FIG. 4A, a possible writing procedure of the I²C bus may include the following steps.

Step 1: The master device sends a start (START, S) signal.

Step 2: The master device sends one byte (8 bits) and waits for an ACK. 7 most significant bits of the byte carry the address of the slave device, and one least significant bit is a read/write flag bit (R/W). When the read/write flag bit is 1, it indicates a read command, and when the read/write flag bit is 0, it indicates a write command. In FIG. 4A, R/W=0, and indicates a write command. Alternatively, in this embodiment of this application, when the read/write control flag is 0, it may indicate a read command, and when the read/write control bit is 1, it indicates a write command. This is not limited in this application.

Step 3: The slave device sends an ACK, to indicate a receiving success.

Step 4: The master device sends one byte and waits for an ACK. The byte carries data to be written into the slave device.

Step 5: The slave device writes the data into a storage unit, and sends an ACK.

It should be noted that step 4 and step 5 herein may be continuously performed for a plurality of times; in other words, the master device sequentially writes the data into the slave device. In FIG. 4A, writing twice is used as an example.

It should be further noted that, if the slave device fails to receive the data or fails to write the data into the storage unit, the slave device needs to send a NACK to the master device. In FIG. 4A, for example, the master device sends an ACK.

Step 6: The master device sends a stop (STOP, P) signal.

Figure 4B:
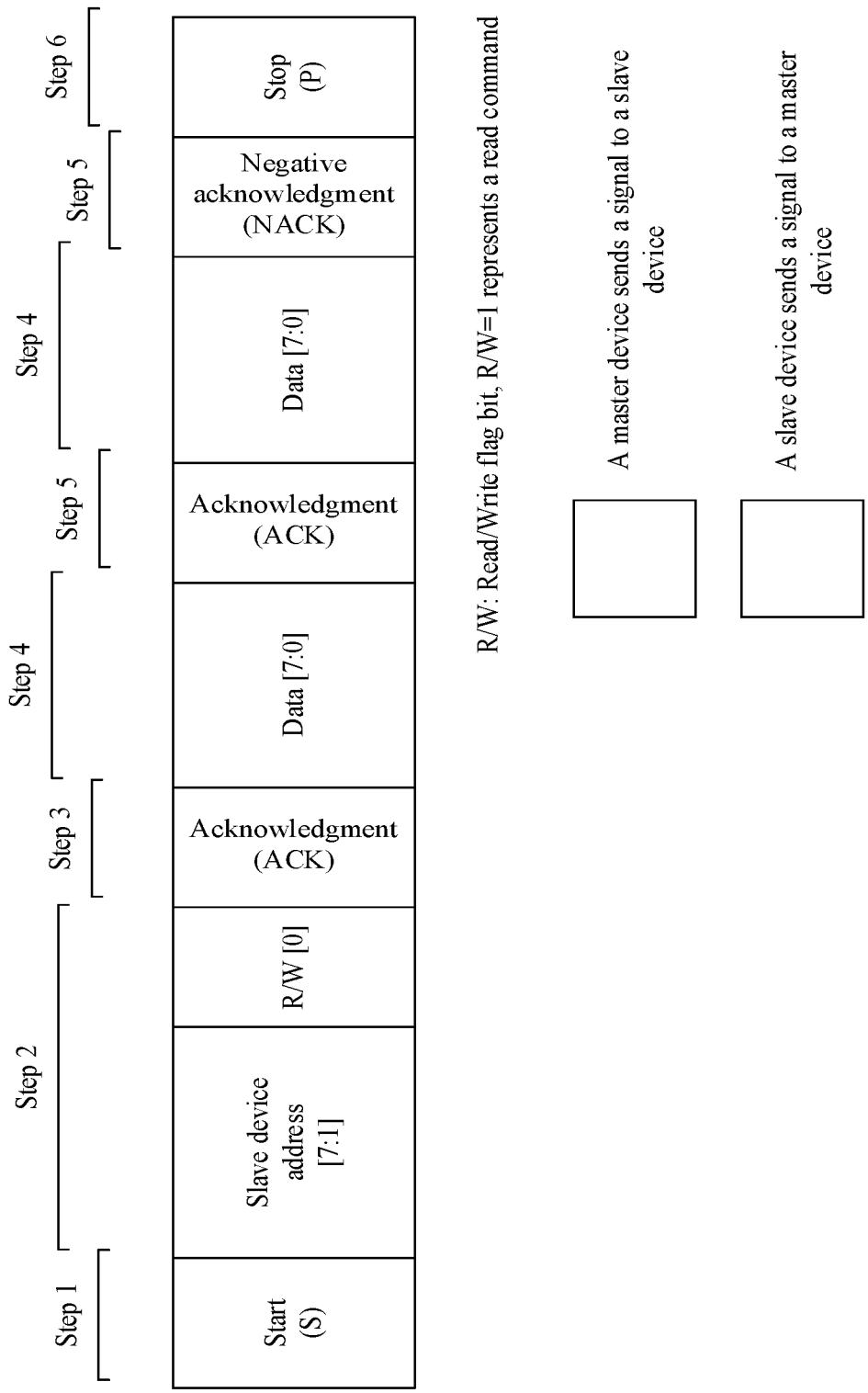
FIG. 4B is a possible flowchart of data reading of an $I^2C$ bus.

As shown in FIG. 4B, a possible reading procedure of the $I^2C$ bus may include the following steps.

Step 1: The master device sends a start signal.

Step 2: The master device sends 1 byte and waits for an ACK. 7 most significant bits of the byte carry the address of the to-be-controlled slave device, and 1 least significant bit is a read/write flag bit (R/W). When the read/write flag bit is 1, it indicates a read command, and when the read/write control bit is 0, it indicates a write command. In FIG. 4B, R/W=1, and indicates a read command.

Step 3: The slave device sends an ACK, to indicate a receiving success.

Step 4: The slave device sends one byte and waits for an ACK. The byte carries data read by the master device (that is, data sent by the slave device to the master device).

Step 5: After receiving the byte, the master device sends an ACK.

It should be noted that step 4 and step 5 herein may be continuously performed for a plurality of times; in other words, the master device sequentially reads the data from the slave device. In FIG. 4B, reading twice is used as an example.

It should be further noted that, if the master device fails to receive the data or the master device completes a data reading operation, the master device needs to send a NACK to the slave device. As shown in FIG. 4B, an acknowledgment signal corresponding to a last group of 8-bit data is a NACK, indicating that the data reading operation of the master device is completed.

Step 6: The master device sends a stop signal.

In some scenarios of an intra-vehicle network, a distance between a master device and a slave device of an $I^2C$ is relatively long (usually approximately 10 meter (m)). Therefore, an $I^2C$ signal needs to be carried in a data packet of a long-distance transmission technology for transparent transmission.

The vehicle-mounted camera shown in FIG. 1 is used as an example. An MDC end is a master, and a camera end is a slave. In a vehicle, the camera is usually mounted on a windshield, a rear bumper, a door post, or the like, and the MDC is mounted inside the vehicle. Therefore, there is a relatively long distance between the camera and the MDC, and an $I^2C$ signal needs to be transmitted remotely. However, an image signal needs to be transmitted between the camera and the MDC, and there is originally a long-distance high-speed transmission interface. Therefore, the $I^2C$ signal may be transparently transmitted on a long-distance high-speed transmission line between the MDC and the camera.

For transparent transmission of an $I^2C$, the $I^2C$ signal needs to be encapsulated into a data packet for transmission based on a specific rule.

FIG. 5 is a schematic diagram of a method for encapsulating a transparently transmitted $I^2C$ signal. In this method, level states on the two lines SCL and SDA of the $I^2C$ are fixedly carried at positions in the data packet, and each level state on the SCL and the SDA uses 1 bit, so that the level states on the two lines are transmitted to a peer end.

In this solution, the states on both the two $I^2C$ lines are encapsulated and transmitted. However, a signal on the clock line SCL is actually meaningless and does not need to be transmitted. Therefore, this solution increases a bandwidth requirement for transmitting the $I^2C$ signal. Second, in this solution, only the level states on the SCL and the SDA are transmitted. The serializer or the deserializer of the master directly maps the states on the SCL and the SDA to an $I^2C$ interface without parsing a meaning of the data, and therefore cannot distinguish chips by using addresses. Therefore, the master can only fixedly access a sensor or a display screen in the camera, but cannot access a serializer or a deserializer in the camera. In addition, in this solution, a plurality of $I^2C$ interfaces cannot be distinguished, and simultaneous transmission of information about of the plurality of $I^2C$ interfaces is not supported.

FIG. 6A and FIG. 6B each are a schematic diagram of another method for encapsulating a transparently transmitted $I^2C$ signal. In this solution, a data packet shown in FIG. 6A is used to encapsulate $I^2C$ data transmitted on the SDA, and each data packet transmits 8-bit data. 2 bits in the packet header indicate whether a load carries 8-bit $I^2C$ data or a special code pattern, and the special code pattern indicates an $I^2C$ line status and feedback information, such as start, stop, ACK, or NACK. The special code pattern is shown in FIG. 6B.

In this disclosure, start and stop (jointly determined by the SCL and the SDA) on the $I^2C$ line are encoded into an 8-bit special code pattern, and 1 bit is converted into 8 bits for transmission. This increases an amount of data to be transmitted. Second, in this disclosure, data packets need to be encapsulated separately for transmission start, transmission stop, an ACK, and a NACK. A minimum data packet is 104 bits, and a requirement for bandwidth is increased. In addition, in this solution, a plurality of $I^2C$ interfaces cannot be distinguished either, and simultaneous transmission of information about the plurality of $I^2C$ interfaces is not supported.

To resolve the foregoing one or more technical problems, an embodiment of this application provides an $I^2C$-based communication solution. In this disclosure, only data on an SDA is encapsulated, and smaller packet header overheads are used, so that signals such as an $I^2C$ line status (for example, communication starts/communication stops) and feedback information (for example, an ACK/a NACK) and 8-bit data of an $I^2C$ can be encapsulated in one data packet. In this way, a bandwidth requirement during encapsulation and transmission of an $I^2C$ signal is reduced. A specific solution is further described in detail in subsequent descriptions.

Figure 8:
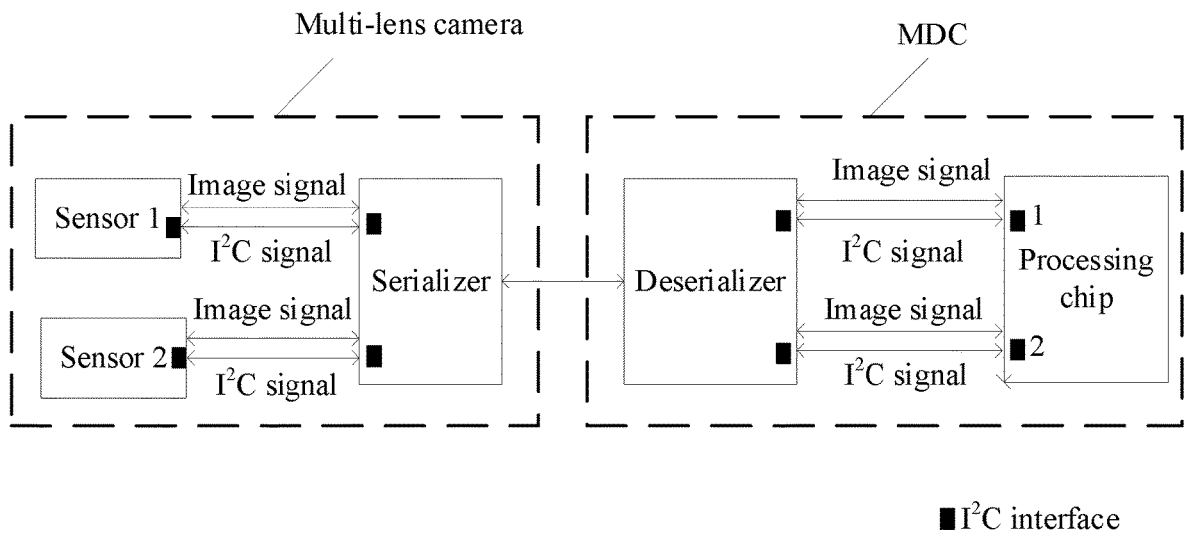
FIG. 8 is a schematic diagram of another possible communication scenario according to an embodiment of this application.
Figure 9:
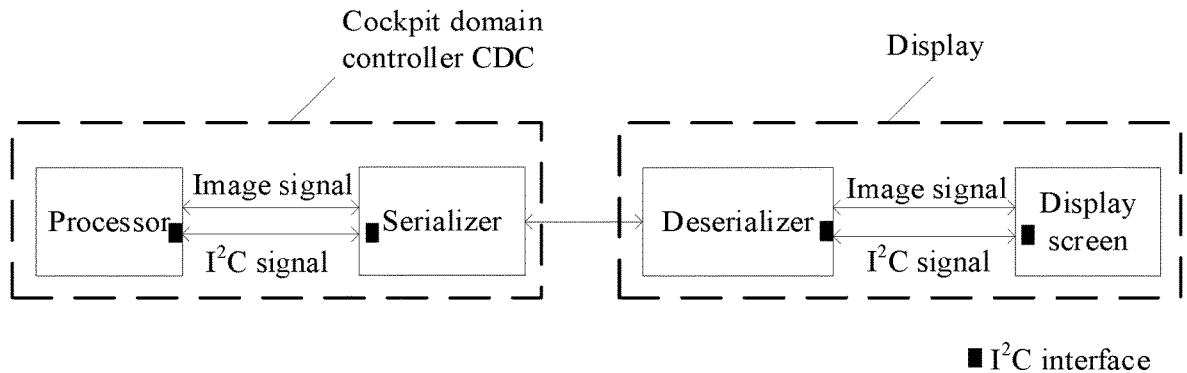
FIG. 9 is a schematic diagram of another possible communication scenario according to an embodiment of this application.

This embodiment of this application may be used in any scenario in which $I^2C$-based communication is required. For example, FIG. 7, FIG. 8, and FIG. 9 show three possible communication scenarios to which this application is applicable.

FIG. 7 shows an application scenario of a monocular camera. An MDC and the monocular camera may communicate with each other based on an $I^2C$. A processing chip in the MDC may be used as a master device and control the camera by using an I²C signal, may specifically control a sensor or a serializer in the camera, and may further control a deserializer in the MDC. The serializer in the camera and the deserializer in the MDC are interface circuits. The serializer and the deserializer are connected through a link. The serializer is configured to convert a low-speed parallel signal into a high-speed serial signal, and the deserializer is configured to convert a high-speed serial signal into a low-speed parallel signal.

It may be understood that the serializer and the sensor in the camera may be used as a slave device as a whole, the camera (the serializer and the sensor as a whole) has a slave address, and the processing chip in the MDC may control the camera by using the I²C signal.

Alternatively, the serializer or the sensor in the camera may alternatively be independently used as a slave device; in other words, the serializer and the sensor each have an independent slave address. The serializer may include at least one register, configured to store data.

In addition, the deserializer in the MDC may alternatively be used as an independent slave device and have an independent slave address.

FIG. 8 shows an application scenario of a multi-lens camera. An MDC and the multi-lens camera may communicate with each other based on an I²C. In this scenario, the MDC may have a plurality of I²C interfaces. In FIG. 8, two I²C interfaces are used as an example. Actually, more I²C interfaces may be included. A quantity of I²C interfaces of the MDC in the multi-lens camera is not limited in this application. A same deserializer/serializer can support simultaneous transmission on a plurality of I²C interfaces. Each I²C interface controls a different sensor. For example, a processing chip in the MDC in FIG. 8 uses an I²C interface 1 to control a sensor 1, and uses an I²C interface 2 to control a sensor 2, or the processing chip uses the I²C interface 1 to control the sensor 2, and uses the I²C interface 2 to control the sensor 1. In this way, a read/write rate of the MDC for the sensor can be improved.

As described above, it may be understood that the serializer and the sensor in the camera shown in FIG. 8 may be used as a slave device as a whole, the camera has an independent slave address. The processing chip in the MDC may control the camera by using an I²C signal.

Alternatively, each serializer or each sensor in the camera may be independently used as a slave device; in other words, each serializer or each sensor has an independent slave address.

In addition, the deserializer in the MDC may alternatively be used as an independent slave device and have an independent slave address.

FIG. 9 shows a large-screen application scenario in which a cockpit domain controller (CDC) and a display may communicate with each other based on an I²C. In this scenario, a processor (a master device) in the CDC controls the display (a slave device) by using an I²C, for example, controls a deserializer and a display screen in the display. Touch information on the display screen may also be transmitted to a processor through an I²C bus.

As described above, it may be understood that the deserializer and the display screen in the display may be used as a slave device as a whole, in other words, the display has a slave address. The processor in the CDC may control the display by using an I²C signal.

Alternatively, the deserializer and the display screen in the display may be independently used as slave devices; in other words, the deserializer and the display screen each have a slave address.

In addition, the serializer in the CDC may alternatively be used as a slave device of the processor and have an independent slave address.

To make objectives, technical solutions, and advantages of embodiments of this application clearer, the following further describes technical solutions in embodiments of this application in detail with reference to the accompanying drawings.

Terms "system" and "network" may be used interchangeably in embodiments of this application. "At least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first field and a second field are merely used to distinguish between different fields, but do not indicate different content, priorities, importance degrees, or the like of the two fields.

In addition, terms "include" and "have" in embodiments, claims, and accompanying drawings of this application are not exclusive. For example, a process, a method, a system, a product, or a device including a series of steps or modules is not limited to listed steps or modules, and may further include steps or modules that are not listed.

Figure 10:
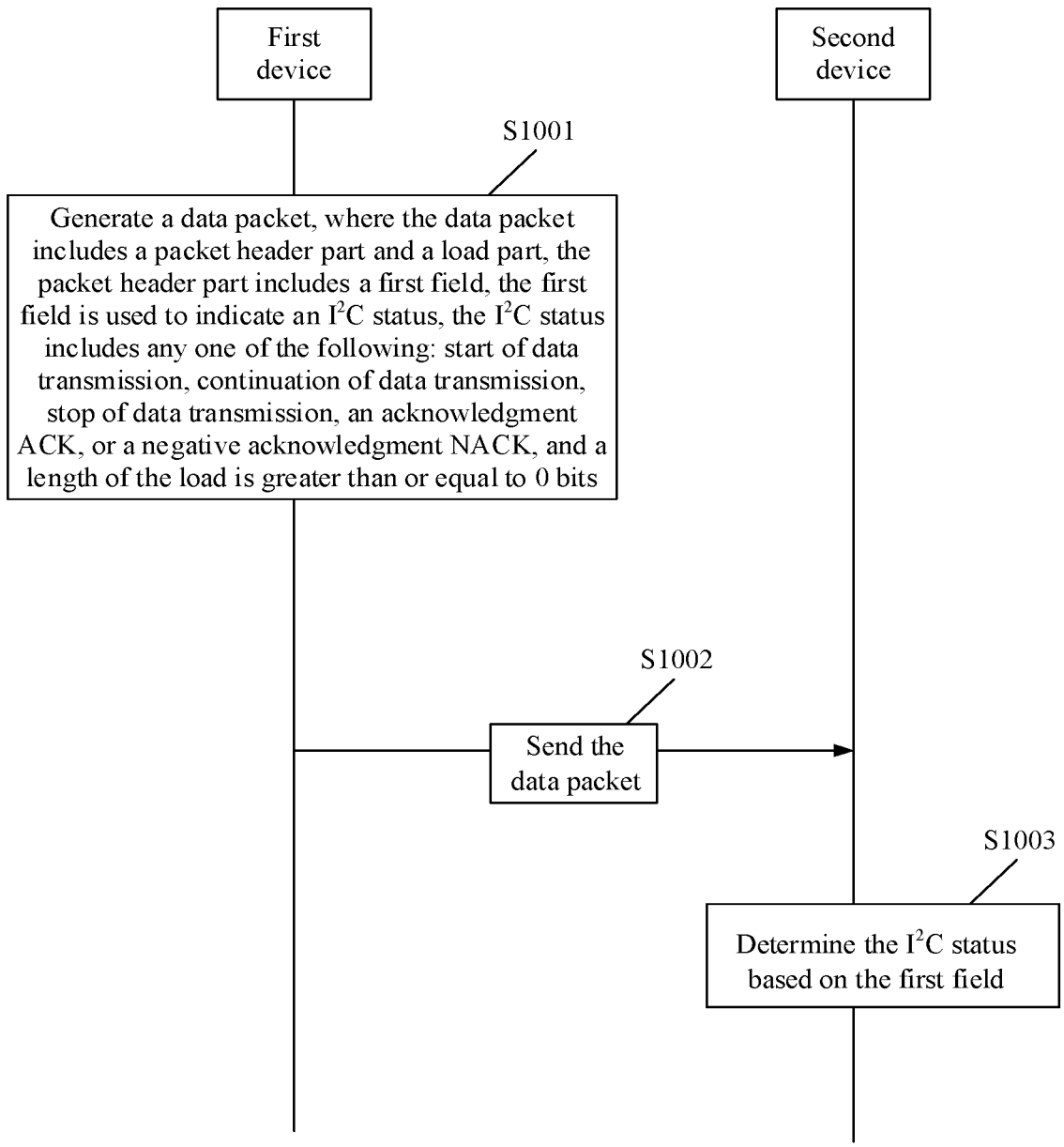
FIG. 10 is a flowchart of an $I^2C$-based communication method according to an embodiment of this application.

As shown in FIG. 10, an embodiment of this application provides an I²C-based communication method. The method may be used in the scenario shown in FIG. 7, FIG. 8, or FIG. 9. The method includes the following steps.

S1001: A first device generates a data packet, where the data packet includes a packet header part and a load part, the packet header part includes a first field, the first field is used to indicate an I²C status, and a length of the load is greater than or equal to 0 bits.

FIG. 11 is a schematic diagram of a possible structure of a data packet according to an embodiment of this application. The data packet includes a packet header part ("packet header" for short) and a load part ("load" for short). Further, the data packet further includes a packet tail. The packet header includes the first field, and the packet tail includes a cyclic redundancy check (CRC) bit. For example, a field length of the first field is 3 bits, but the field length may actually be another value such as 4 bits or 5 bits. This is not limited herein.

The I²C status is used to represent a communication status of an I²C bus, or represent a signal type on the I²C bus, or represent level states on an SDA and an SCL of the I²C bus. The I²C status includes but is not limited to the following five types: start of data communication, continuation of data transmission, stop of data transmission, an ACK, and a NACK. It should be understood that one data packet corresponds to one type.

Different values of the first field represent different I²C statuses. For example, a first value is used to indicate that the I²C status is the start of data transmission, a second value is used to indicate that the I²C status is the continuation of data transmission, a third value is used to indicate that the I²C status is the stop of data transmission, a fourth value is used to indicate that the I²C status is the ACK, and a fifth value is used to indicate that the I²C status is the NACK. Certainly, an actual value of the first field is not limited to five types, and there may actually be more values.

FIG. 12 shows an example of a possible value of the first field. A value range of the first field is 0x0 to 0x7, where 0x0 to 0x4 separately represent the foregoing five I²C statuses, and 0x5 to 0x7 are reserved fields and may be used to indicate I²C statuses other than the foregoing five I²C statuses.

When the I²C status is the start of data transmission or the stop of data transmission, the first device is a master and the second device is a slave. When the I²C status is the continuation of data transmission, the stop of data transmission, the ACK, or the NACK, the first device is a master and the second device is a slave, or the second device is a master and the first device is a slave. In other words, a first field in a data packet generated by the master may indicate any one of the following: the start of data transmission, the stop of data transmission, the continuation of data transmission, the ACK, or the NACK, and a first field in a data packet generated by the slave may indicate any one of the continuation of data transmission, the ACK, or the NACK.

It may be understood that the master in this embodiment of this application may be a controller, such as the MDC in FIG. 7, the MDC in FIG. 8, or the CDC in FIG. 9, or may be a processing chip in a controller, such as the processing chip in the MDC or the processor in the CDC. The slave in this embodiment of this application may be a peripheral device or a peripheral component, such as the camera in FIG. 7, the camera in FIG. 8, or the display in FIG. 9, or may be a chip in a peripheral device or a peripheral component, such as the sensor or the serializer in the camera, or the deserializer or the display screen in the display. Certainly, the foregoing is merely an example, and another possibility is not excluded in actual application.

Definitions of the start of data transmission, the continuation of data transmission, the stop of data transmission, the ACK, and the NACK are described below.

(1) Start of data transmission: A start signal (or a start state) is generated on an I²C bus; in other words, an SCL is at a high level, and an SDA changes from a high level to a low level, as shown by a start condition in FIG. 3. In this case, the first device is a master, such as the processing chip in the MDC, and the second device is a slave, such as the deserializer in the MDC, the deserializer in the camera, or the sensor in the camera.

It may be understood that the load part of the data packet may not carry data; in other words, the length of the load is 0; or the data packet does not include the load part.

Optionally, the load part of the data packet may carry data; in other words, the length of the load is greater than 0; or the data packet includes the load part.

In a possible design, the load part carries a 7-bit slave address (used for bus addressing) and a 1-bit read/write flag (used to indicate whether current communication is data reading or data writing), and a corresponding length of the load is 8 bits. Certainly, an actual length of the load is not limited thereto. For example, I²C data of (N×8) bits may also be carried.

The slave address is used to indicate a chip to be controlled by the master, such as the sensor in the camera or the serializer in the camera (which may further specifically be a register in the serializer).

(2) Continuation of data transmission: This state is an intermediate state between the start of data transmission and the stop of data transmission. A signal of I²C data is generated on the I²C bus when the I²C status is the continuation of data transmission.

It should be understood that the I²C data in this embodiment of this application is data other than an acknowledgment signal (the NACK and the ACK) transmitted by the first device and the second device on the I²C bus after the start of data transmission and before the stop of data transmission.

Figure 13A:
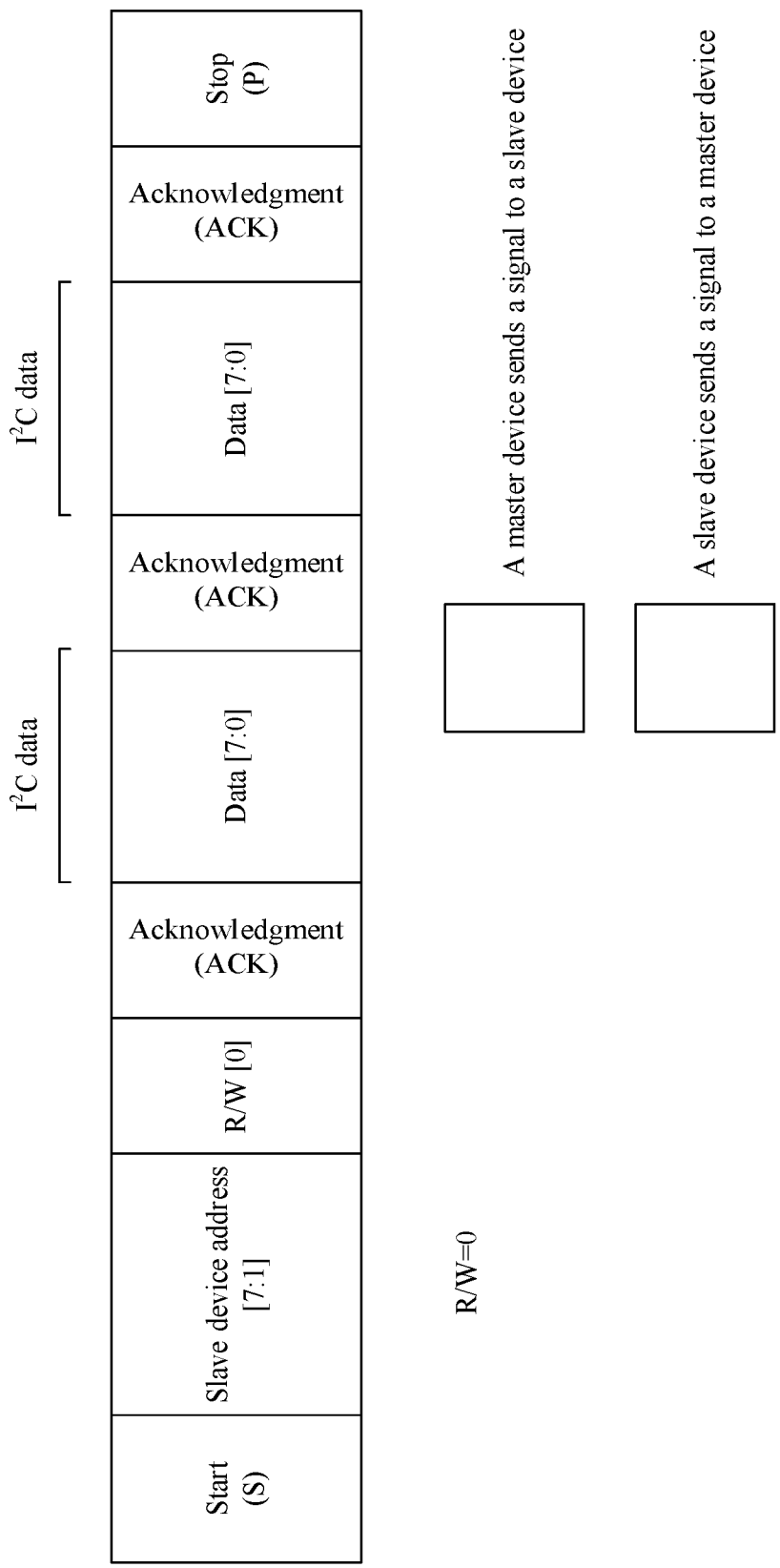
FIG. 13A is a schematic diagram in which a master sends $I^2C$ data to a slave.
Figure 13B:
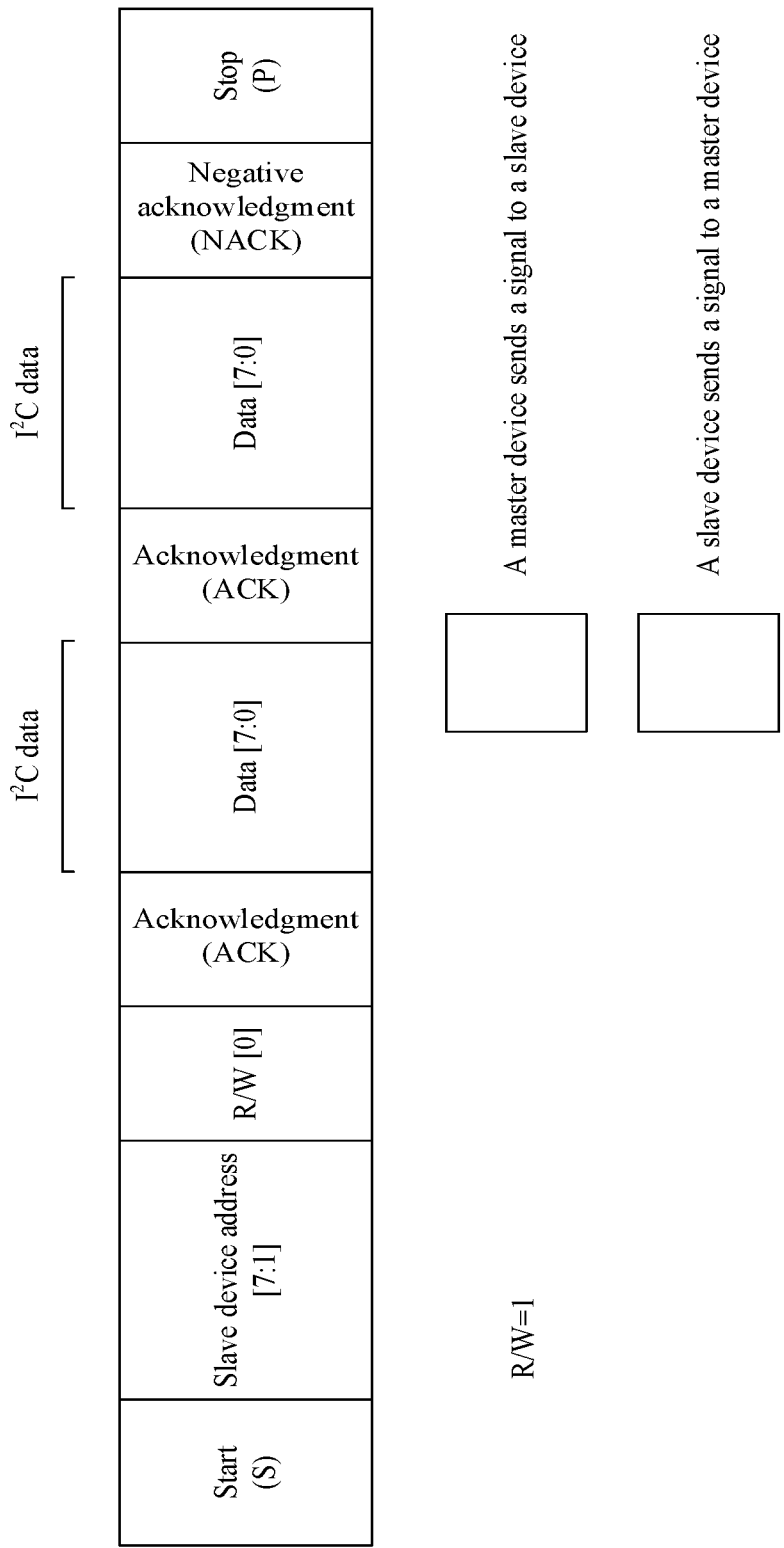
FIG. 13B is a schematic diagram in which a slave sends $I^2C$ data to a master.

In this case, the first device is a master, such as the processing chip in the camera, and the second device is a slave, such as the deserializer in the MDC, the deserializer in the camera, or the sensor in the camera. FIG. 13A shows an example in which the master sends I²C data to the slave. Alternatively, the second device is a master, such as the processing chip in the camera, and the first device is a slave, such as the deserializer in the MDC, the deserializer in the camera, or the sensor in the camera. FIG. 13B shows an example in which the slave sends I²C data to the master.

It should be understood that I²C data is transmitted by using 8 bits as a group. After a group of 8-bit I²C data is transmitted, before transmitting a next group of I²C data, a data sender needs to wait until a receiver feeds back an ACK or a NACK. It should be understood that, in the following embodiments of this specification, except for special specifications, I²C data in one unit (for example, one piece of I²C data, one group of I²C data, or one segment of I²C data) means I²C data whose length is 8 bits.

(3) Stop of data transmission: A stop signal (or a stop state) is generated on the I²C bus; in other words, an SCL is at a high level, and an SDA changes from a low level to a high level, as shown by a stop condition in FIG. 3. After the stop signal occurs on the I²C bus and before a next start state occurs, no I²C data is transmitted on the I²C bus. In this case, the first device is a master, such as the processing chip in the MDC, and the second device is a slave, such as the deserializer in the MDC, the deserializer in the camera, or the sensor in the camera. The load part of the data packet does not carry I²C data; in other words, the length of the load is 0.

(4) The ACK indicates that the first device correctly receives I²C data (8 bits) sent by the second device, and an ACK state is generated on the I²C bus. In this case, the first device is a master, such as the processing chip in the MDC, and the second device is a slave, such as the deserializer in the MDC, the deserializer in the camera, or the sensor in the camera; or the second device is a master, such as the processing chip in the MDC, and the first device is a slave, such as the deserializer in the MDC, the deserializer in the camera, or the sensor in the camera. This is not limited.

(5) The NACK indicates that the first device fails to receive the I²C data from the second device or cannot parse a meaning of the I²C data received from the second device, or the master (the first device) stops reading data from the slave (the second device), and a NACK state is generated on the I²C bus. In this case, the first device is a master, such as the processing chip in the MDC, and the second device is a slave, such as the deserializer in the MDC, the deserializer in the camera, or the sensor in the camera; or the second device is a master, such as the processing chip in the MDC, and the first device is a slave, such as the deserializer in the MDC, the deserializer in the camera, or the sensor in the camera. This is not limited.

Optionally, as shown in FIG. 13B, if the first device is a slave and the second device is a master, in a process in which the master performs a read operation on the slave, when the slave sends acknowledgment information (an ACK or a NACK) for "slave address+read/write flag bit" to the master, the slave may encapsulate the ACK/NACK and a read first group of I$^2$C data into one data packet for transmission, to reduce overheads.

S1002: The first device sends the data packet to the second device, and the second device receives the data packet from the first device.

In this embodiment of this application, the first device may support one or more I$^2$C interfaces, the second device may support one or more I$^2$C interfaces, and the data packet may be transmitted between the first device and the second device based on one or more I$^2$C transmission channels.

For example, if the first device is the processing chip in the MDC, and the second device is the sensor in the monocular camera in FIG. 7, the data packet is transmitted between the first device and the second device based on one I$^2$C transmission channel, that is, a transmission channel between an I$^2$C interface of the sensor and an I$^2$C interface of the processing chip.

For example, if the first device is the processing chip in the MDC in FIG. 8, and the second device is the serializer in the multi-lens camera in FIG. 8 or the deserializer in the MDC, the data packet may be transmitted between the first device and the second device based on at most two I$^2$C transmission channels at the same time, for example, a transmission channel between an I$^2$C interface of the sensor 1 and an I$^2$C interface 1 of the processing chip, and a transmission channel between an I$^2$C interface of the sensor 2 and an I$^2$C interface 2 of the processing chip.

S1003: The second device determines an I$^2$C status based on the first field.

After receiving the data packet, the second device parses the data packet.

For example, if the second device determines, based on the first field, that the I$^2$C status is the start of data transmission, the second device generates a start state on at least one I$^2$C interface, that is, controls the SCL to be at a high level and the SDA to change from a high level to a low level.

Optionally, the second device may further obtain the slave address and the read/write flag from the load part, and send, through at least one I$^2$C interface, the slave address and the read/write flag to a slave device to which the slave address points.

For example, if the first device is the processing chip in the MDC in FIG. 8, the second device is the serializer (which is a slave device of the processing chip in the MDC) in the multi-lens camera in FIG. 8, and the slave address points to the sensor 1 (the slave device of the processing chip in the MDC), after receiving the data packet, the serializer sends the slave address and the read/write flag to the sensor 1 through the I$^2$C interface of the sensor 1.

Further, if the read/write flag indicates data reading, the second device subsequently reads I$^2$C data from the chip and sends the I$^2$C data to the first device; and if the read/write flag indicates data writing, the second device subsequently receives I$^2$C data from the first device and writes the received I$^2$C data into the chip.

For example, if the second device determines, based on the first field, that the I$^2$C status is the continuation of data transmission, the second device sends, through at least one I$^2$C interface, I$^2$C data to a slave device to which the slave address points.

For example, if the first device is the processing chip in the MDC in FIG. 8, the second device is the serializer (which is a slave device of the processing chip in the MDC) in the multi-lens camera in FIG. 8, and the slave address points to the sensor 2 (the slave device of the processing chip in the MDC), after receiving the data packet, the serializer sends I$^2$C data to the sensor 2 through the I$^2$C interface of the sensor 2.

For example, if the second device determines, based on the first field, that the I$^2$C status is the stop of data transmission, a stop state is generated on at least one I$^2$C interface, that is, controls the SCL to be at a high level and the SDA to change from a low level to a high level.

For example, if the second device determines, based on the first field, that the I$^2$C status is the ACK, an ACK state is generated on at least one I$^2$C interface, to indicate that corresponding 8-bit I$^2$C data is successfully received.

For example, if the second device determines, based on the first field, that the I$^2$C status is the NACK, a NACK state is generated on at least one I$^2$C interface, to indicate that corresponding 8-bit I$^2$C data fails to be received or a meaning of 8-bit I$^2$C data cannot be parsed or that the master stops reading data from the slave.

It can be learned from the foregoing descriptions that, in this embodiment of this application, only data on the SDA line is encapsulated and transmitted, so that transmission bandwidth can be reduced, and transmission efficiency can be improved. In this embodiment of this application, the first field is set in the packet header of the data packet to indicate the I$^2$C status, and the load part is used to carry the slave address, the read/write flag, or the I$^2$C data, so that states such as the start of transmission, the ACK, and the NACK do not need to be separately encapsulated into a data packet, but are encapsulated into a same data packet together with the slave address, the read/write flag, or the I$^2$C data, and therefore, transmission bandwidth can be further reduced, and transmission efficiency can be further improved. In addition, in this embodiment of this application, when the data packet is encapsulated, a meaning of the data is parsed such that reading/writing slave devices can be distinguished based on slave addresses, and a same I$^2$C interface can control different slave devices.

Optionally, in this embodiment of this application, the packet header part further includes a second field, the second field is used to indicate a flow ID of a flow to which the data packet belongs, and each flow ID corresponds to at least one I$^2$C interface. It should be understood that the flow ID in this specification is used to distinguish between I$^2$C interfaces; in other words, data packets with a same flow ID are transmitted on a same I$^2$C interface. In this way, when the data packet is transmitted between the first device and the second device, a serializer/deserializer in the first device and the second device may distinguish between I$^2$C interfaces by identifying flow IDs, and allocate each data packet to an I$^2$C interface corresponding to the flow ID of the data packet for transmission, so that simultaneous transmission of signals on a plurality of I$^2$C interfaces can be supported between the first device and the second device, and therefore transmission efficiency is improved.

FIG. 14 is a schematic diagram of another possible structure of a data packet according to an embodiment of this application. In addition to the first field used to indicate the I²C status, the packet header further includes a second field used to indicate a flow ID. It should be understood that, for example, the second field in FIG. 14 is 2 bits, but this is not limited thereto in practice. For example, the second field may alternatively be 3 bits, 4 bits, or 5 bits. A specific length may be set by a person skilled in the art based on a quantity of I²C interfaces or another rule.

In this embodiment of this application, a correspondence between a flow ID and an I²C interface may be a one-to-one relationship; in other words, data packets corresponding to a same flow ID can be transmitted only on a same I²C interface. Alternatively, the correspondence between the flow ID and the I²C interface may be a one-to-many relationship; in other words, data packets corresponding to a same flow ID may be transmitted on a plurality of different I²C interfaces. Alternatively, the correspondence between the flow ID and the I²C interface may be a many-to-one relationship; in other words, data packets with different flow IDs may be transmitted on a same I²C interface. Alternatively, the correspondence between the flow ID and the I²C interface may be a many-to-many relationship; in other words, data packets corresponding to a plurality of different flow IDs may be transmitted on a plurality of different I²C interfaces. This is not limited in this application.

Herein, a one-to-one correspondence between the flow ID and the I²C interface is described as an example with reference to the scenario shown in FIG. 8. As shown in FIG. 8, it is assumed that a flow ID "1" corresponds to an I²C interface 1, and a flow ID "2" corresponds to an I²C interface 2. When sending the data packet to the sensor 1 of the multi-lens camera, the MDC may indicate, in the second field in the packet header of the data packet, that the flow ID is "1". After the data packet is transmitted to the serializer of the multi-lens camera, the serializer identifies the flow ID "1", and distributes the data packet to the sensor 1. When sending the data packet to the sensor 2 of the multi-lens camera, the MDC may indicate, in the second field in the packet header of the data packet, that the flow ID is "2". After the data packet is transmitted to the serializer of the multi-lens camera, the serializer identifies the flow ID "2", and distributes the data packet to the sensor 2. Correspondingly, when sending the data packet to the MDC, the sensor 1 of the multi-lens camera may indicate, in the second field in the packet header of the data packet, that the flow ID is "1". After the data packet is transmitted to the deserializer of the MDC, the deserializer identifies the flow ID "1", and transmits the data packet to the processing chip in the MDC through the I²C interface 1, so that the processing chip can identify that the data packet is from the sensor 1. When sending the data packet to the MDC, the sensor 2 of the multi-lens camera may indicate, in the second field in the packet header of the data packet, that the flow ID is "2". After the data packet is transmitted to the deserializer of the MDC, the deserializer identifies the flow ID "2", and transmits the data packet to the processing chip in the MDC through the I²C interface 2, so that the processing chip can identify that the data packet is from the sensor 2.

Optionally, in this embodiment of this application, the packet header part further includes a third field, and the third field is used to indicate that the data packet is an I²C-based data packet. The third field may be specifically implemented by using one field, or may be implemented by using a plurality of fields. This is not limited herein.

For example, FIG. 15 is a schematic diagram of another possible structure of a data packet according to an embodiment of this application. In addition to the first field used to indicate the I²C status and the second field used to indicate the flow ID, the packet header further includes a third field used to indicate an encapsulation service type of the data packet.

It should be understood that, for example, the third field in FIG. 15 is 4 bits, but this is not limited thereto in practice. For example, the third field may alternatively be 2 bits, 3 bits, or 5 bits. A specific length may be set by a person skilled in the art based on a type of a data packet that may be transmitted between the first device and the second device or another rule.

When the third field is a first preset value, the third field is used to indicate that the encapsulation service type of the data packet is I²C; in other words, the data packet is an I²C-based data packet. If the third field is another value other than the first preset value, the third field may be used to indicate a data packet of another encapsulation service type, for example, a general-purpose input/output (GPIO), a serial peripheral interface (SPI), or an asynchronous transmitting/receiving transmitter (Universal Asynchronous Receiver/Transmitter (UART)).

For example, FIG. 16 is a schematic diagram of another possible structure of a data packet according to an embodiment of this application. In addition to the first field used to indicate the I²C status and the second field used to indicate the flow ID, the packet header further includes a fourth field and a fifth field (in other words, the third field actually includes two fields: the fourth field and the fifth field). The fourth field is used to indicate an encapsulation service type, and the fifth field is used to indicate a data format. When the fourth field is a second preset value, it indicates that the encapsulation service type is a control service, and when the fifth field is a third preset value, it indicates that the data format is I²C data.

It should be understood that, for example, the fourth field in FIG. 16 is 4 bits, and the fifth field is 6 bits, but this is not limited thereto. For example, the fourth field may alternatively be 2 bits, 3 bits, 5 bits, or the like, and the fifth field may alternatively be 4 bits, 8 bits, 12 bits, or the like. A specific length of the fourth field may be set by a person skilled in the art based on a type of an encapsulation service supported by the first device and the second device or another rule, and a specific length of the fifth field may be set by a person skilled in the art based on a type of a data format supported by the first device and the second device or another rule.

When the encapsulation service type indicated by the fourth field is a control service and the data format indicated by the fifth field is I²C data, the encapsulation service type of the data packet is I²C; in other words, the data packet is an I²C-based data packet. If the encapsulation service type indicated by the fourth field is not the control service (for example, is a data service), the data packet is not an I²C-based data packet. If the encapsulation service type indicated by the fourth field is the control service, but the data format indicated by the fifth field is not I²C data (for example, is SPI data, UART data, or GPIO data), the data packet is not an I²C-based data packet either.

Optionally, in this embodiment of this application, in addition to the first field, the second field, and the third field, the packet header may further include another field, such as a cyclic sequence number used to count data packets. For example, a load length indicator is used to indicate a length of data in a load. In addition, the packet header may further include some reserved fields that may be used for subsequent expansion.

Figures 18, 19:
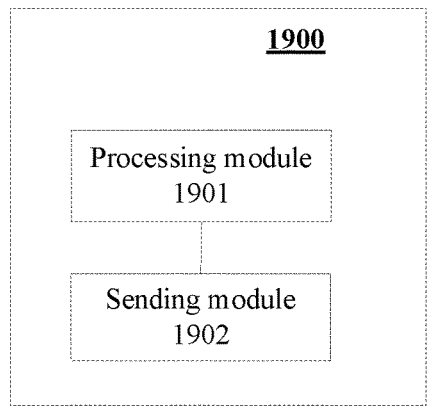
FIG. 18 is a schematic diagram of another possible structure of a data packet according to an embodiment of this application.
FIG. 19 is a schematic diagram of an $I^2C$-based communication apparatus 1900 according to an embodiment of this application.
Figure 20:
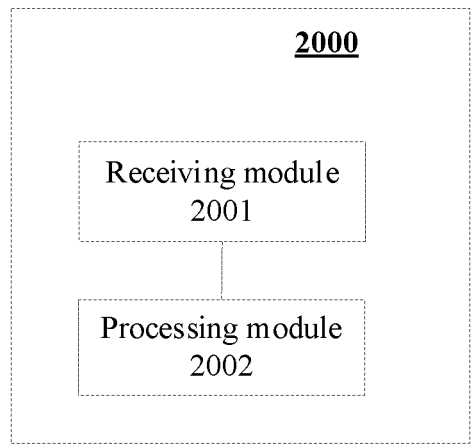
FIG. 20 is a schematic diagram of another I²C-based communication apparatus 2000 according to an embodiment of this application.

It should be noted that the foregoing implementations of this application may be combined with each other to form different data packet structures and implement different technical effects. For example, FIG. 17 is a schematic diagram of another possible structure of a data packet according to an embodiment of this application. FIG. 17 is an example obtained after a cyclic sequence number field and a load length indication field are further added to the packet header of the data packet shown in FIG. 15. FIG. 18 is a schematic diagram of another possible structure of a data packet according to an embodiment of this application. FIG. 18 is an example obtained after a cyclic sequence number field and a load length indication field are further added to the packet header of the data packet shown in FIG. 16. Certainly, in actual application, there may be other combination manners that are not listed one by one herein.

The method provided in embodiments of this application is described above with reference to FIG. 11 to FIG. 18. An apparatus provided in embodiments of this application is described below with reference to FIG. 19 to FIG. 22.

Based on a same technical concept, an embodiment of this application further provides an $I^2C$-based communication apparatus 1900. The apparatus 1900 has functions of implementing the first device in the embodiments shown in FIG. 11 to FIG. 18. For example, the apparatus 1900 includes corresponding modules, units, or means for performing the steps performed by the first device in the embodiments shown in FIG. 11 to FIG. 18. The functions, units, or means may be implemented by software or hardware, or may be implemented by executing corresponding software by hardware.

For example, as shown in FIG. 19, the apparatus 1900 may include a processing module 1901 configured to generate a data packet, where the data packet includes a packet header part and a load part, the packet header part includes a first field, the first field is used to indicate an $I^2C$ status, and the $I^2C$ status includes any one of start of data transmission, continuation of data transmission, stop of data transmission, an ACK, or a NACK, and a length of the load is greater than or equal to 0 bits; and a sending module 1902 configured to send the data packet to a second device.

In a possible implementation, a value of the first field includes one or more of a first value used to indicate that the $I^2C$ status is the start of data transmission; a second value used to indicate that the $I^2C$ status is the continuation of data transmission; a third value used to indicate that the $I^2C$ status is the stop of data transmission; a fourth value used to indicate that the $I^2C$ status is the ACK; and a fifth value used to indicate that the $I^2C$ status is the NACK.

Certainly, the foregoing five values are merely examples rather than limitations. During specific implementation, the first field may have more or fewer values.

In a possible implementation, the first field indicates that the $I^2C$ status is the start of data transmission, and the load part carries a slave address of a slave device and a read/write flag.

In a possible implementation, the first field indicates that the $I^2C$ status is the continuation of data transmission, and the load part carries $I^2C$ data.

In a possible implementation, the packet header part further includes a second field, the second field is used to indicate a flow ID of a flow to which the data packet belongs, and the flow ID corresponds to at least one $I^2C$ interface.

A correspondence between the flow ID and the $I^2C$ interface may be a one-to-one, one-to-many, many-to-one, or many-to-many relationship. This is not limited in this application.

In a possible implementation, the packet header part further includes a third field, and the third field is used to indicate that the data packet is an $I^2C$-based data packet.

The third field may be specifically implemented by using one field, or may be implemented by using a plurality of fields. This is not limited herein.

It should be understood that all related content of the steps in the foregoing method embodiments may be cited in function descriptions of the corresponding functional modules. Details are not described herein again.

Based on a same technical concept, an embodiment of this application further provides an $I^2C$-based communication apparatus 2000. The apparatus 2000 has functions of implementing the second device in the embodiments shown in FIG. 11 to FIG. 18. For example, the apparatus 2000 includes corresponding modules, units, or means for performing the steps performed by the second device in the embodiments shown in FIG. 11 to FIG. 18. The functions, units, or means may be implemented by software or hardware, or may be implemented by executing corresponding software by hardware.

For example, the apparatus 2000 may include: a receiving module 2001, configured to receive a data packet from a first device, where the data packet includes a packet header part and a load part, the packet header part includes a first field, the first field is used to indicate an $I^2C$ status, and the $I^2C$ status includes any one of start of data transmission, continuation of data transmission, stop of data transmission, an acknowledgment ACK, or a negative acknowledgment NACK, and a length of the load is greater than or equal to 0 bits; and a processing module 2002, configured to determine an $I^2C$ status based on the first field.

In a possible implementation, a value of the first field includes one or more of a first value used to indicate that the $I^2C$ status is the start of data transmission; a second value used to indicate that the $I^2C$ status is the continuation of data transmission; a third value used to indicate that the $I^2C$ status is the stop of data transmission; a fourth value used to indicate that the $I^2C$ status is the ACK; and a fifth value used to indicate that the $I^2C$ status is the NACK.

Certainly, the foregoing five values are merely examples rather than limitations. During specific implementation, the first field may have more or fewer values.

In a possible implementation, the first field indicates that the $I^2C$ status is the start of data transmission, and the load part carries a slave address of a slave device and a read/write flag; and the processing module 2002 is further configured to generate a start state on at least one $I^2C$ interface, and send, through the at least one $I^2C$ interface, the slave address and the read/write flag to the slave device to which the slave address points.

In a possible implementation, the first field indicates that the $I^2C$ status is the continuation of data transmission, and the load part carries $I^2C$ data; and the processing module 2002 is further configured to send, through at least one $I^2C$ interface, the $I^2C$ data to a slave device to which a slave address points.

In a possible implementation, the packet header part further includes a second field, the second field is used to indicate a flow identifier ID of a flow to which the data packet belongs, and the flow ID corresponds to at least one $I^2C$ interface.

A correspondence between the flow ID and the $I^2C$ interface may be a one-to-one, one-to-many, many-to-one, or many-to-many relationship. This is not limited in this application.

In a possible implementation, the packet header part further includes a third field, and the third field is used to indicate that the data packet is an I²C-based data packet.

The third field may be specifically implemented by using one field, or may be implemented by using a plurality of fields. This is not limited herein.

It should be understood that all related content of the steps in the foregoing method embodiments may be cited in function descriptions of the corresponding functional modules. Details are not described herein again.

Figure 21:
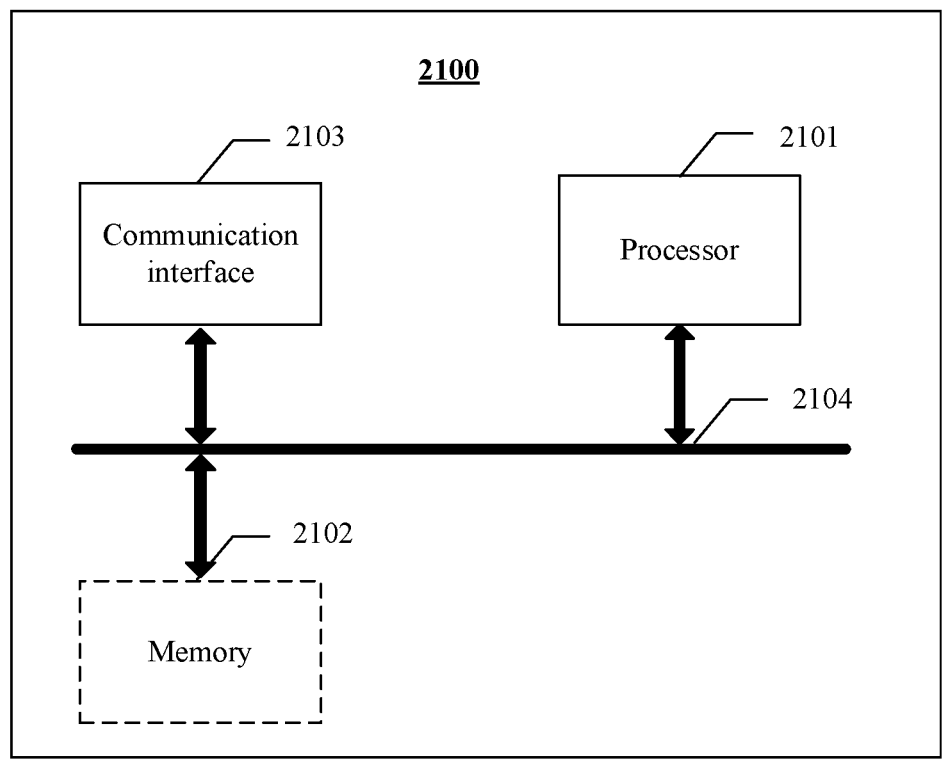
FIG. 21 is a schematic diagram of a structure of an apparatus 2100 according to an embodiment of this application.

Based on a same technical concept, as shown in FIG. 21, an embodiment of this application further provides an apparatus 2100, including: at least one processor 2101 and a communication interface 2103 communicatively connected to the at least one processor 2101. The at least one processor 2101 executes instructions stored in the memory 2102, so that the apparatus is enabled to perform, by using the communication interface 2103, the method steps performed by the first device in the embodiments shown in FIG. 11 to FIG. 18.

It should be understood that FIG. 21 shows only one processor 2101, and there may actually be a plurality of processors 2101.

Optionally, the memory 2102 is located outside the apparatus 2100.

Optionally, the apparatus 2100 includes the memory 2102, the memory 2102 is connected to the at least one processor 2101, and the memory 2102 stores instructions that can be executed by the at least one processor 2101.

It should be understood that, in FIG. 21, a dashed line is used to indicate that the memory 2102 is optional for the apparatus 2100.

The processor 2101 and the memory 2102 may be coupled through an interface circuit, or may be integrated together. This is not limited herein.

A specific connection medium between the processor 2101, the memory 2102, and the communication interface 2103 is not limited in this embodiment of this application. In this embodiment of this application, the processor 2101, the memory 2102, and the communication interface 2103 are connected through a bus 2104 in FIG. 21. The bus is represented by a bold line in FIG. 21. A manner of connection between other components is merely an example for description, and is not limited thereto. The bus may be classified into an address bus, a data bus, a control bus, and the like. For ease of representation, only one bold line is used for representation in FIG. 21, but this does not mean that there is only one bus or only one type of bus.

Figure 22:
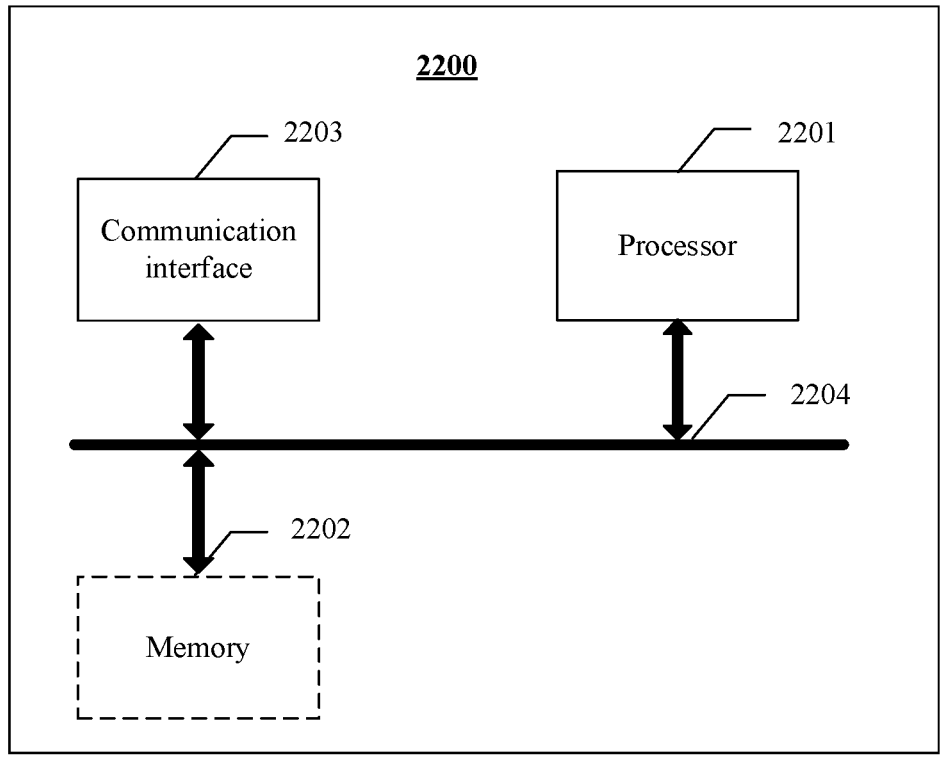
FIG. 22 is a schematic diagram of a structure of an apparatus 2200 according to an embodiment of this application.

Based on a same technical concept, as shown in FIG. 22, an embodiment of this application further provides an apparatus 2200, including: at least one processor 2201 and a communication interface 2203 communicatively connected to the at least one processor 2201. The at least one processor 2201 executes instructions stored in the memory 2202, so that the apparatus is enabled to perform, by using the communication interface 2203, the method steps performed by the second device in the embodiments shown in FIG. 11 to FIG. 18.

It should be understood that FIG. 22 shows only one processor 2201, and there may actually be a plurality of processors 2201.

Optionally, the memory 2202 is located outside the apparatus 2200.

Optionally, the apparatus 2200 includes the memory 2202, the memory 2202 is connected to the at least one processor 2201, and the memory 2202 stores instructions that can be executed by the at least one processor 2201. In FIG. 22, a dashed line is used to indicate that the memory 2202 is optional for the apparatus 2200.

The processor 2201 and the memory 2202 may be coupled through an interface circuit, or may be integrated together. This is not limited herein.

A specific connection medium between the processor 2201, the memory 2202, and the communication interface 2203 is not limited in this embodiment of this application. In this embodiment of this application, the processor 2201, the memory 2202, and the communication interface 2203 are connected through a bus 2204 in FIG. 22. The bus is represented by using a bold line in FIG. 22. A manner of connection between other components is merely an example for description, and is not limited thereto. The bus may be classified into an address bus, a data bus, a control bus, and the like. For ease of representation, only one bold line is used for representation in FIG. 22, but this does not mean that there is only one bus or only one type of bus.

It should be understood that the processor mentioned in embodiments of this application may be implemented by hardware or may be implemented by software. When the processor is implemented by hardware, the processor may be a logic circuit, an integrated circuit, or the like. When the processor is implemented by using software, the processor may be a general-purpose processor, and is implemented by reading software code stored in the memory.

For example, the processor may be a central processing unit (CPU), or may be another general-purpose processor, a digital signal processor (DSP), an application-specific integrated circuit (ASIC), a field-programmable gate array (FPGA), another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include both a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), and is used as an external cache. By way of example instead of limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

It should be noted that when the processor is a general-purpose processor, a DSP, an ASIC, an FPGA, another programmable logic device, a discrete gate or a transistor logic device, or a discrete hardware component, the memory (a storage module) may be integrated into the processor.

It should be noted that the memory described in this specification is intended to include but not limited to these memories and a memory of another appropriate type.

Figure 23:
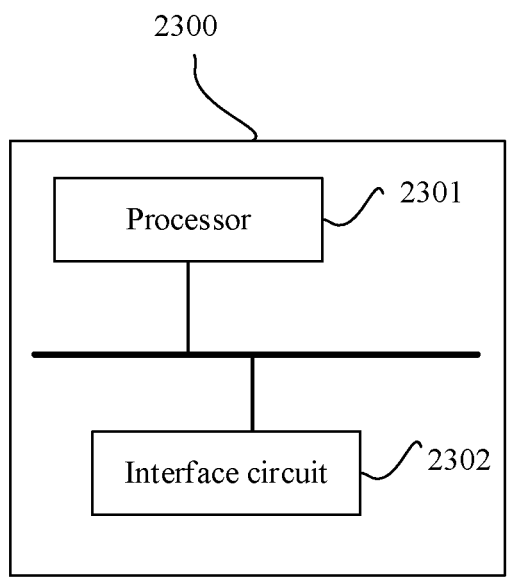
FIG. 23 is a schematic diagram of a structure of an apparatus 2300 according to an embodiment of this application.

Based on a same technical concept, as shown in FIG. 23, an embodiment of this application further provides an apparatus 2300, including a processor 2301 and an interface circuit 2302. The interface circuit 2302 is configured to receive code instructions and transmit the code instructions to the processor 2301. The processor 2301 may run the code instructions to perform the methods performed by the first device in the embodiments shown in FIG. 11 to FIG. 18.

Figure 24:
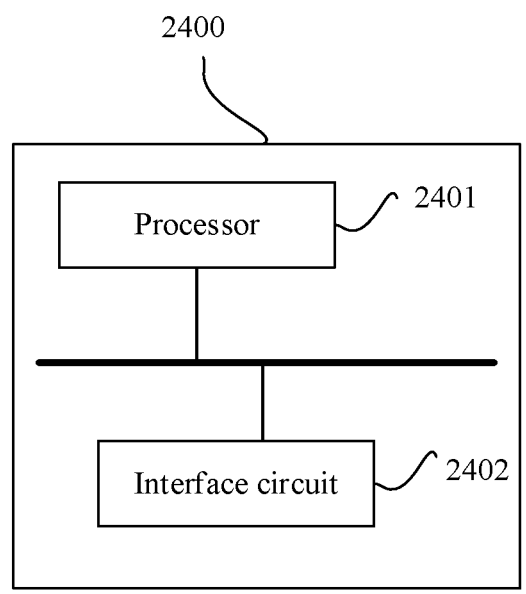
FIG. 24 is a schematic diagram of a structure of an apparatus 2400 according to an embodiment of this application.

Based on a same technical concept, as shown in FIG. 24, an embodiment of this application further provides an apparatus 2400, including a processor 2401 and an interface circuit 2402. The interface circuit 2402 is configured to receive code instructions and transmit the code instructions to the processor 2401. The processor 2401 may run the code instructions to perform the methods performed by the second device in the embodiments shown in FIG. 11 to FIG. 18.

Based on a same technical concept, an embodiment of this application further provides a chip. The chip is coupled to a memory, and is configured to read and execute program instructions stored in the memory, to implement the methods performed by the first device in the embodiments shown in FIG. 11 to FIG. 18.

Based on a same technical concept, an embodiment of this application further provides a chip. The chip is coupled to a memory, and is configured to read and execute program instructions stored in the memory, to implement the methods performed by the second device in the embodiments shown in FIG. 11 to FIG. 18.

Based on a same technical concept, an embodiment of this application further provides a computer readable storage medium. The computer readable storage medium is configured to store instructions. When the instructions are executed, the methods performed by the first device in the embodiments shown in FIG. 11 to FIG. 18 are implemented.

Based on a same technical concept, an embodiment of this application further provides a computer readable storage medium. The computer readable storage medium is configured to store instructions. When the instructions are executed, the methods performed by the second device in the embodiments shown in FIG. 11 to FIG. 18 are implemented.

Based on a same technical concept, an embodiment of this application further provides a computer program product including instructions. The computer program product stores the instructions. When the instructions are run on a computer, the computer is enabled to perform the methods performed by the first device in the embodiments shown in FIG. 11 to FIG. 18.

Based on a same technical concept, an embodiment of this application further provides a computer program product including instructions. The computer program product stores the instructions. When the instructions are run on a computer, the computer is enabled to perform the methods performed by the second device in the embodiments shown in FIG. 11 to FIG. 18.

A person skilled in the art should understand that embodiments of this application may be provided as a method, an apparatus, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage mediums (including but not limited to a disk memory, a compact disk (CD)-ROM, an optical memory, and the like) including computer-usable program code.

This application is described with reference to flowcharts and/or block diagrams of the method, the apparatus, the system, and the computer program product in this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

The computer program instructions may alternatively be stored in a computer readable memory that can guide a computer or another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operation steps are performed on the computer or the other programmable device, to generate computer-implemented processing. Therefore, the instructions executed on the computer or the other programmable device provide steps for implementing a specific function in one or more procedures in the flowcharts and/or in one or more blocks in the block diagrams.

It is clearly that a person skilled in the art can make various modifications and variations to this application without departing from the scope of this application. In this way, this application is intended to cover these modifications and variations provided that they fall within the scope of protection defined by the following claims and their equivalent technologies.

What is claimed is:

1. A communication method implemented by a first device, wherein the communication method comprises:
generating a data packet comprising a packet header and a load, wherein the packet header comprises a first field indicating an inter integrated circuit ($I^2C$) status and a third field comprising a fourth field and a fifth field, wherein the third field indicates that the data packet is an $I^2C$-based data packet when the fourth field indicates that an encapsulation service type of the data packet is a control service and the fifth field indicates that a data format of the data packet is $I^2C$ data, wherein the $I^2C$ status is start of data transmission, continuation of the data transmission, stop of the data transmission, an acknowledgment (ACK), or a negative acknowledgment (NACK), and wherein a length of the load is greater than or equal to 0 bits; and
sending the data packet to a second device.

2. The communication method of claim 1, wherein the first field comprises:
a first value indicating that the $I^2C$ status is the start of the data transmission;
a second value indicating that the $I^2C$ status is the continuation of the data transmission;
a third value indicating that the $I^2C$ status is the stop of the data transmission;
a fourth value indicating that the $I^2C$ status is the ACK; or
a fifth value indicating that the $I^2C$ status is the NACK.

3. The communication method of claim 1, wherein the first field indicates that the $I^2C$ status is the start of the data transmission, and wherein the load carries a slave address of a slave device and carries a read/write flag.

4. The communication method of claim 3, wherein the slave address is 7 bits and the read/write flag is 1 bit.

5. The communication method of claim 1, wherein the first field indicates that the $I^2C$ status is the continuation of the data transmission, and wherein the load carries $I^2C$ data.

6. The communication method of claim 1, wherein the packet header further comprises a second field indicating an I²C interface.

7. The communication method of claim 6, wherein the second field indicates a flow identifier (ID) of a flow of the data packet, and wherein the flow ID corresponds to the I²C interface.

8. The communication method of claim 1, wherein the third field indicates that the data packet is the I²C-based data packet when the third field is a first preset value.

9. The communication method of claim 8, wherein the fourth field indicates that the encapsulation service type is the control service when the fourth field is a second preset value, and wherein the fifth field indicates that the data format is the I²C data when the fifth field is a third preset value.

10. A communication method implemented by a second device, wherein the communication method comprises:
   receiving, from a first device, a data packet comprising a packet header and a load, wherein the packet header comprises a first field indicating an inter integrated circuit (I²C) status and a third field comprising a fourth field and a fifth field, wherein the third field indicates that the data packet is an I²C-based data packet when the fourth field indicates that an encapsulation service type of the data packet is a control service and the fifth field indicates that a data format of the data packet is I²C data, wherein the I²C status is start of data transmission, continuation of the data transmission, stop of the data transmission, an acknowledgment (ACK), or a negative acknowledgment (NACK), and wherein a length of the load is greater than or equal to 0 bits; and
   determining the I²C status based on the first field.

11. The communication method of claim 10, wherein the first field comprises:
   a first value indicating that the I²C status is the start of the data transmission;
   a second value indicating that the I²C status is the continuation of the data transmission;
   a third value indicating that the I²C status is the stop of the data transmission;
   a fourth value indicating that the I²C status is the ACK; or
   a fifth value indicating that the I²C status is the NACK.

12. The communication method of claim 10, wherein the first field indicates that the I²C status is the start of the data transmission, wherein the load carries a slave address of a slave device and carries a read/write flag, and wherein the communication method further comprises:
   generating a start state on at least one I²C interface; and
   sending, through the at least one I²C interface, the slave address and the read/write flag to the slave device corresponding to the slave address.

13. The communication method of claim 10, wherein the first field indicates that the I²C status is the continuation of the data transmission, wherein the load carries I²C data, and wherein the communication method further comprises sending, through at least one I²C interface, the I²C data to a slave device corresponding to a slave address.

14. The communication method of claim 10, wherein the packet header further comprises a second field indicating an I²C interface.

15. The communication method of claim 14, wherein the second field indicates a flow identifier (ID) of a flow of the data packet, and wherein the flow ID corresponds to the I²C interface.

16. The communication method of claim 10, wherein the third field indicates that the data packet is the I²C-based data packet when the third field is a first preset value.

17. A communication apparatus, comprising:
   a memory configured to store instructions; and
   a processor coupled to the memory and configured to:
      generate a data packet comprising a packet header and a load, wherein the packet header comprises a first field indicating an I²C status and a third field comprising a fourth field and a fifth field, wherein the third field indicates that the data packet is an I²C-based data packet when the fourth field indicates that an encapsulation service type of the data packet is a control service and the fifth field indicates that a data format of the data packet is I²C data, wherein the I²C status is start of data transmission, continuation of the data transmission, stop of the data transmission, an acknowledgment (ACK), or a negative acknowledgment (NACK), and wherein a length of the load is greater than or equal to 0 bits; and
      send the data packet to a second device.

18. The communication apparatus of claim 17, wherein the first field comprises:
   a first value indicating that the I²C status is the start of the data transmission;
   a second value indicating that the I²C status is the continuation of the data transmission;
   a third value indicating that the I²C status is the stop of the data transmission;
   a fourth value indicating that the I²C status is the ACK; or
   a fifth value indicating that the I²C status is the NACK.

19. The communication apparatus of claim 17, wherein the first field indicates that the I²C status is the start of the data transmission, and wherein the load carries a slave address of a slave device and carries a read/write flag.

20. The communication apparatus of claim 17, wherein the first field indicates that the I²C status is the continuation of the data transmission, and wherein the load carries I²C data.

21. The communication apparatus of claim 17, wherein the packet header further comprises a second field indicating an I²C interface.

22. The communication apparatus of claim 21, wherein the second field indicates a flow identifier (ID) of a flow of the data packet, and wherein the flow ID corresponds to the I²C interface.

23. The communication apparatus of claim 17, wherein the third field indicates that the data packet is the I²C-based data packet when the third field is a first preset value.

24. A communication apparatus, comprising:
   a memory configured to store instructions; and
   a processor coupled to the memory and configured to:
      receive a data packet from a first device, wherein the data packet comprises a packet header and a load, wherein the packet header comprises a first field indicating an I²C status and a third field comprising a fourth field and a fifth field, wherein the third field indicates that the data packet is an I²C-based data packet when the fourth field indicates that an encapsulation service type of the data packet is a control service and the fifth field indicates that a data format of the data packet is I²C data, wherein the I²C status is start of data transmission, continuation of the data transmission, stop of the data transmission, an acknowledgment (ACK), or a negative acknowledgment (NACK), and wherein a length of the load is greater than or equal to 0 bits; and determine the I²C status based on the first field.

25. The communication apparatus of claim 24, wherein the first field comprises:
  a first value indicating that the I²C status is the start of the data transmission;
  a second value indicating that the I²C status is the continuation of the data transmission;
  a third value indicating that the I²C status is the stop of the data transmission;
  a fourth value indicating that the I²C status is the ACK; or
  a fifth value indicating that the I²C status is the NACK.

26. The communication apparatus of claim 24, wherein the first field indicates that the I²C status is the start of the data transmission, wherein the load carries a slave address of a slave device and carries a read/write flag, and wherein the processor is further configured to:
  generate a start state on at least one I²C interface; and
  send, through the at least one I²C interface, the slave address and the read/write flag to the slave device corresponding to the slave address.

27. The communication apparatus of claim 24, wherein the first field indicates that the I²C status is the continuation of the data transmission, wherein the load carries I²C data, and wherein the processor is further configured to send, through at least one I²C interface, the I²C data to a slave device corresponding to a slave address.

28. The communication apparatus of claim 24, wherein the packet header further comprises a second field indicating an I²C interface.

29. The communication apparatus of claim 28, wherein the second field indicates a flow identifier (ID) of a flow of the data packet, and wherein the flow ID corresponds to at least one I²C interface.

30. The communication apparatus of claim 24, wherein the third field indicates that the data packet is the I²C-based data packet when the third field is a first preset value.

* * * * *